(12) United States Patent
Kim et al.

(10) Patent No.: US 10,524,288 B2
(45) Date of Patent: Dec. 31, 2019

(54) METHOD AND APPARATUS FOR INCREASING TRANSMISSION COVERAGE OF STA PERFORMING INITIAL ACCESS IN WIRELESS LAN

(71) Applicant: LG ELECTRONICS INC., Seoul (KR)

(72) Inventors: Suhwook Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/549,997

(22) PCT Filed: Aug. 7, 2015

(86) PCT No.: PCT/KR2015/008271
§ 371 (c)(1),
(2) Date: Aug. 9, 2017

(87) PCT Pub. No.: WO2016/129766
PCT Pub. Date: Aug. 18, 2016

(65) Prior Publication Data
US 2018/0049240 A1    Feb. 15, 2018

Related U.S. Application Data

(60) Provisional application No. 62/114,573, filed on Feb. 10, 2015.

(51) Int. Cl.
*H04W 74/08* (2009.01)
*H04W 84/12* (2009.01)
*H04W 74/00* (2009.01)

(52) U.S. Cl.
CPC ......... *H04W 74/08* (2013.01); *H04W 74/006* (2013.01); *H04W 84/12* (2013.01); *H04W 74/0833* (2013.01)

(58) Field of Classification Search
None
See application file for complete search history.

(56) References Cited

U.S. PATENT DOCUMENTS

2013/0250904 A1*   9/2013   Kang .................. H04B 7/0452
                                                            370/329
2013/0294397 A1   11/2013   Lee et al.
(Continued)

FOREIGN PATENT DOCUMENTS

WO    2011108832    9/2011

OTHER PUBLICATIONS

PCT International Application No. PCT/KR2015/008271, International Search Report dated Nov. 19, 2015, 2 pages.

*Primary Examiner* — Chi H Pham
*Assistant Examiner* — Raul Rivas
(74) *Attorney, Agent, or Firm* — Lee Hong Degerman Kang Waimey

(57) ABSTRACT

A method and an apparatus for increasing transmission coverage of an STA performing an initial access in a wireless LAN are disclosed. An initial access method in a wireless LAN can comprise the steps of: transmitting a trigger frame on a channel by an AP; receiving, by the AP, a first probe request frame transmitted on a first sub-channel by a first STA as a response to the trigger frame; and transmitting, by the AP, on the channel, an MU PPDU including a first probe response frame, which is a response to the first probe request frame, and a second probe response frame, which is a
(Continued)

response to the second probe request frame, wherein the channel can include the first sub-channel and the second sub-channel.

8 Claims, 20 Drawing Sheets

(56) References Cited

U.S. PATENT DOCUMENTS

| | | | |
|---|---|---|---|
| 2013/0315219 A1* | 11/2013 | Cheong | H04W 28/16 370/338 |
| 2014/0177616 A1 | 6/2014 | Seok | |
| 2014/0192742 A1 | 7/2014 | Gong et al. | |
| 2015/0003377 A1* | 1/2015 | Wu | H04W 74/08 370/329 |

* cited by examiner

FIG. 1
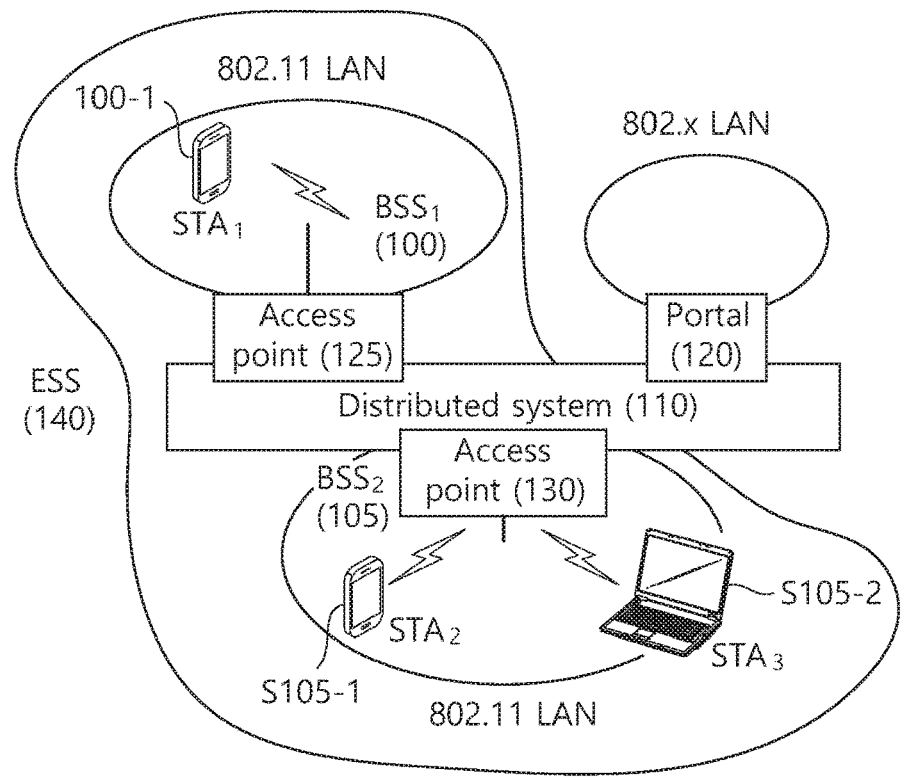
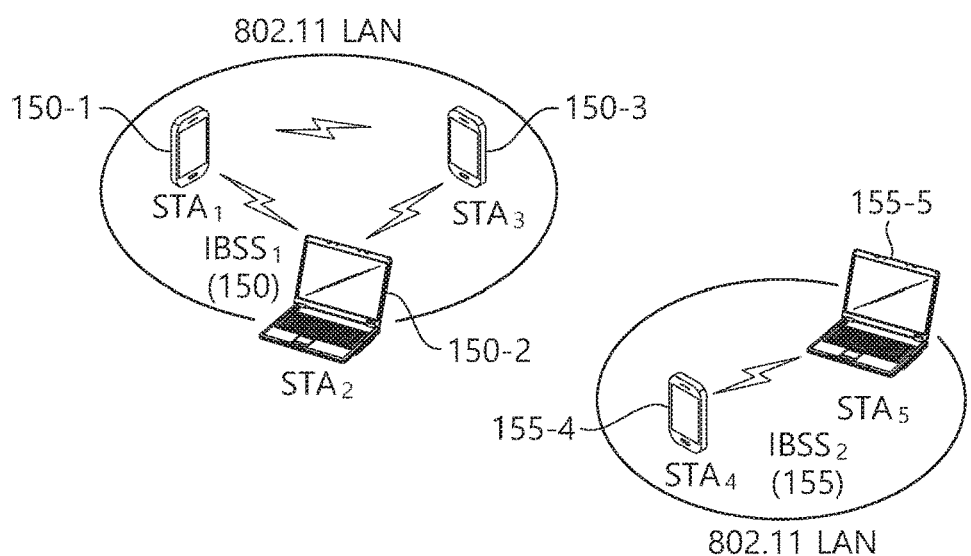

METHOD AND APPARATUS FOR INCREASING TRANSMISSION COVERAGE OF STA PERFORMING INITIAL ACCESS IN WIRELESS LAN

CROSS-REFERENCE TO RELATED APPLICATIONS

This application is the National Stage filing under 35 U.S.C. 371 of International Application No. PCT/KR2015/008271, filed on Aug. 7, 2015, which claims the benefit of U.S. Provisional Application No. 62/114,573, filed on Feb. 10, 2015, the contents of which are all hereby incorporated by reference herein in their entirety.

BACKGROUND OF THE INVENTION

Field of the Invention

The present invention relates to wireless communication and, more particularly, to a method and apparatus for increasing transmission coverage of STA performing initial access in wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

One object of the present invention is to provide a method for increasing transmission coverage of an STA performing initial access in a wireless LAN.

Another object of the present invention is to provide an STA with increased transmission coverage when initial access is performed in a wireless LAN.

To achieve the technical objects of the present invention, a method for initial access in a wireless LAN according to one aspect of the present invention comprises an AP (Access Point)'s transmitting a trigger frame on a channel; the AP's receiving a first probe request frame transmitted on a first sub-channel by a first station (STA) in response to the trigger frame; the AP's receiving a second probe request frame transmitted on a second sub-channel by a second STA in response to the trigger frame; and the AP's transmitting on the channel an MU (Multi-User) PPDU (Physical Layer Protocol Unit) including a first probe response frame which is a response to the first probe request frame and a second probe response frame which is a response to the second probe request frame, wherein the channel includes the first sub-channel and the second sub-channel.

To achieve the technical objects of the present invention, an AP performing an initial access procedure with an STA (station) in a wireless LAN according to another aspect of the present invention comprises an RF (Radio Frequency) unit implemented to transmit or receive a radio signal and a processor connected to the RF unit operatively, wherein the processor is configured to transmit a trigger frame on a channel; to receive a first probe request frame transmitted on a first sub-channel by a first STA in response to the trigger frame; to receive a second probe request frame transmitted on a second sub-channel by a second STA in response to the trigger frame; and to transmit on the channel an MU (Multi-User) PPDU (Physical Layer Protocol Unit) including a first probe response frame which is a response to the first probe request frame and a second probe response frame which is a response to the second probe request frame, wherein the channel includes the first sub-channel and the second sub-channel.

The disparity in the transmission ranges between an initial access frame and other frame may be removed, and wireless LAN coverage may be increased by increasing transmission coverage of an initial access frame.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
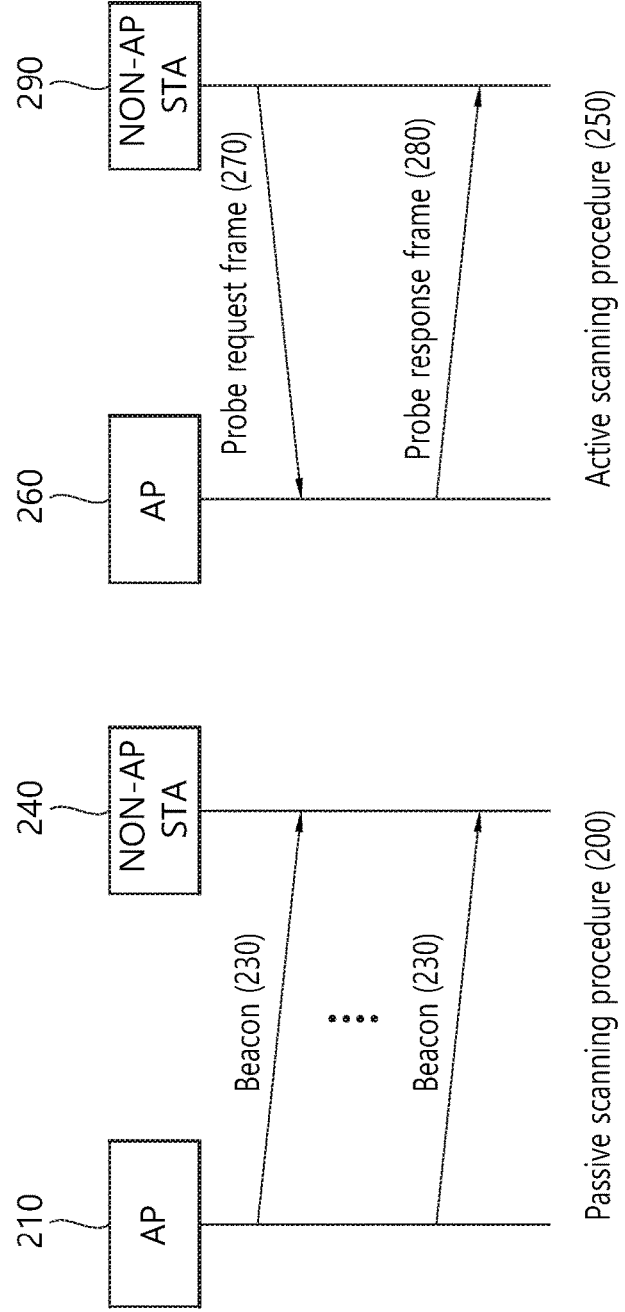
FIG. 2 is a conceptual view illustrating a scanning method in a wireless LAN.

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs association of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmbTM/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
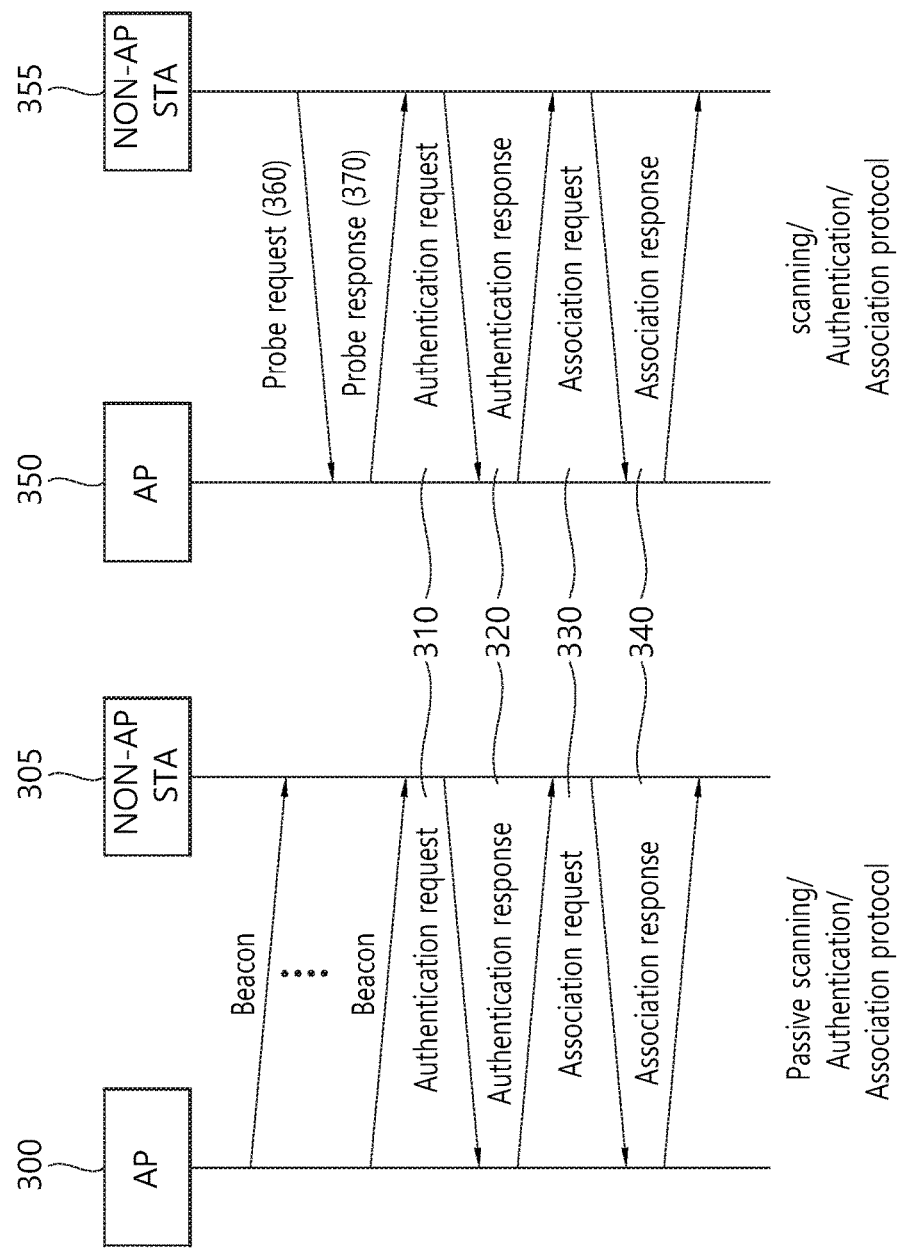
FIG. 3 is a conceptual view illustrating an authentication procedure and an association procedure being performed after the scanning procedure of the AP and the STA.

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA may operate based on two operating modes (or states), i.e., an active mode (awake state) and a sleep mode (doze state) to save power consumption. An STA support the power save mode by operating the awake state or the doze state.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. If a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
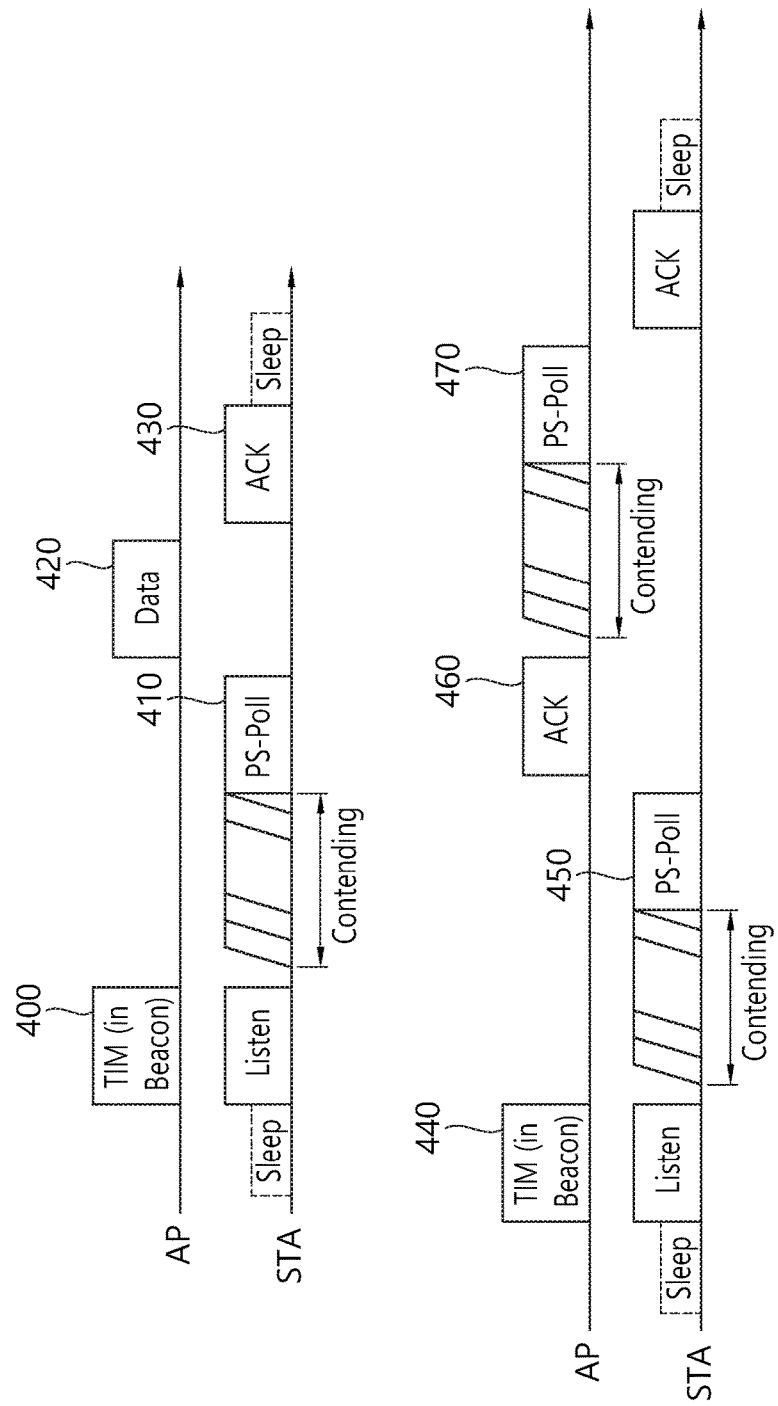
FIG. 4 is a conceptual view illustrating a power save method based on a beacon frame.

FIG. 4 is a conceptual view illustrating a power save method based on a beacon frame.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap.

The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
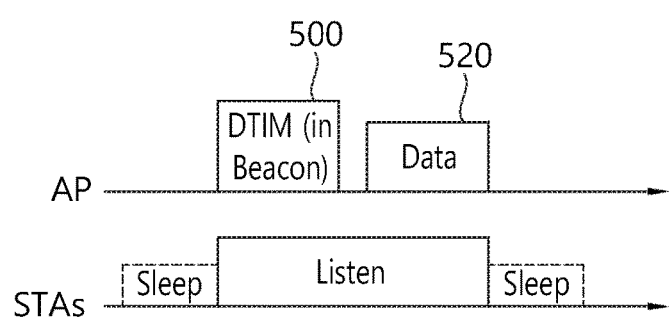
FIG. 5 is a conceptual view illustrating a power save method based on a beacon frame.

FIG. 5 is a conceptual view illustrating a power save method based on a beacon frame.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

In the embodiment of the present invention given below, transmission from an AP to an STA may be described by the term of downlink transmission. A PPDU, frame, and data transmitted through downlink transmission may be expressed by the terms of downlink PPDU, downlink frame, and downlink data, respectively. A PPDU may be a data unit comprising a PPDU header and a PSDU (Physical layer Service Data Unit) (or MPDU (MAC Protocol Data Unit)). A PPDU header may comprises a PHY header and a PHY preamble; and a PSDU (or MPDU) may include a frame (or an information unit of the MAC layer) or indicate a frame. The PHY header may be called alternatively the PLCP (Physical Layer Convergence Protocol) header, and the PHY preamble the PLCP preamble.

Similarly, transmission from an STA to an AP may be described by the term of uplink transmission. A PPDU, frame, and data transmitted through uplink transmission may be expressed by the terms of uplink PPDU, uplink frame, and uplink data, respectively.

In an existing WLAN system, the whole bandwidth has been used for downlink transmission to one STA and uplink transmission by one STA based on SU (Single User)-OFDM (Orthogonal Frequency Division Multiplexing). And an AP in the existing WLAN system performs DL MU transmission based on the MU-MIMO (Multiple Input Multiple Output) scheme, which may be expressed by the term of DL MU MIMO transmission.

In a WLAN system according to an embodiment of the present invention, OFDMA (Orthogonal Frequency Division Multiple Access) technology may be supported for uplink and downlink transmission. More specifically, in a WLAN system according to an embodiment of the present invention, the AP may perform DL MU transmission based on OFDMA, which may be expressed by the term of DL MU OFDMA transmission. If DL MU OFDMA transmission is performed, the AP may transmit downlink data (or downlink frame or downlink PPDU) to each of a plurality of STAs through the respective frequency resources on the overlapping time resources. DL MU OFDMA transmission may be used with DL MU MIMO transmission. For example, DL MU-MIMO transmission may be performed on the basis of a plurality of space-time streams (or spatial streams) on a specific sub-band (or sub-channel) allocated for DL MU OFDMA transmission.

In a WLAN system according to an embodiment of the present invention, UL MU transmission (uplink multi-user transmission) may be supported for a plurality of STAs to transmit data to an AP on the same time resources. Uplink transmission by each of a plurality of STAs may be performed on the frequency domain or spatial domain. If each of a plurality of STAs performs uplink transmission on the frequency domain, the OFDMA scheme may allocate a different frequency resource (sub-band or sub-channel) for a uplink transmission resource with respect to each of the plurality of STAs. Each of the plurality of STAs may transmit uplink data to the AP through a different frequency resource allocated to the respective STAs. The transmission method using separate frequency resources described above may be expressed by the term of UL MU OFDMA transmission method.

If each of a plurality of STAs performs uplink transmission on the spatial domain, a different space-time stream (or spatial stream) is allocated to each of the plurality of STAs, and each of the plurality of STAs may transmit uplink data to the AP through the different space-time stream. The transmission method using different space-time streams may be expressed by the term of UL MU MIMO transmission method.

UL MU OFDMA transmission and UL MU MIMO transmission may be performed together. For example, UL MU MIMO transmission may be performed on the basis of a plurality of space-time streams (or spatial streams) on a specific sub-band (or sub-channel) allocated for UL MU OFDMA transmission.

If a plurality of STAs transmit uplink frames through each of a plurality of sub-bands (or sub-channels) on the overlapping time resources according to the UL MU OFDMA transmission scheme, each of the plurality of STAs may transmit uplink frames by using frequency bandwidth (bandwidth in units of sub-channel) smaller than 20 MHz, which is the smallest bandwidth of an existing WLAN system (or bandwidth in channel units). If transmission power of uplink frames of an STA is limited (or does not change), as the frequency bandwidth for transmitting a uplink frame is reduced, transmission coverage of the uplink frame transmitted by using the corresponding bandwidth may be increased. For example, if an STA uses the same transmission power, the transmission coverage of a uplink frame transmitted through the bandwidth of 20 MHz may be smaller than the transmission coverage of a uplink frame transmitted by using the bandwidth of 10 MHz.

If UL MU OFDMA transmission is used instead of the conventional SU OFDM transmission, uplink transmission may be performed by using smaller bandwidth than 20 MHz, which is the smallest transmission bandwidth for conventional WLAN system. Therefore, if UL MU OFDMA transmission is used, the transmission range of a uplink frame by an STA is increased.

In the conventional WLAN system, the initial access procedure (scanning procedure, authentication procedure, and association procedure) is defined only for SU OFDM transmission. Therefore, for communication with an AP, an STA first performs a scanning/authentication/association procedure with the AP based on SU OFDM transmission, and the STA may communicate with the AP according to UL MU OFDMA transmission after being connected to the AP. Therefore, the STA may communicate with the AP within relatively wide coverage through UL MU OFDMA transmission only when the STA is connected to the AP within relatively narrow coverage supported by SU OFDM transmission. Therefore, unless the STA is at a distant location from the AP after being connected thereto (or unless the STA is mobile), there may not be an effect of increasing the transmission distance based on DL/UL MU OFDMA transmission in the WLAN system.

Therefore, in the embodiment of the present invention given below, disclosed will be a method for supporting a scanning/authentication/association procedure of an STA so that transmission coverage wider than that of SU OFDM transmission supported for the scanning, authentication, and association procedure in the existing WLAN system may be obtained.

Figure 6:
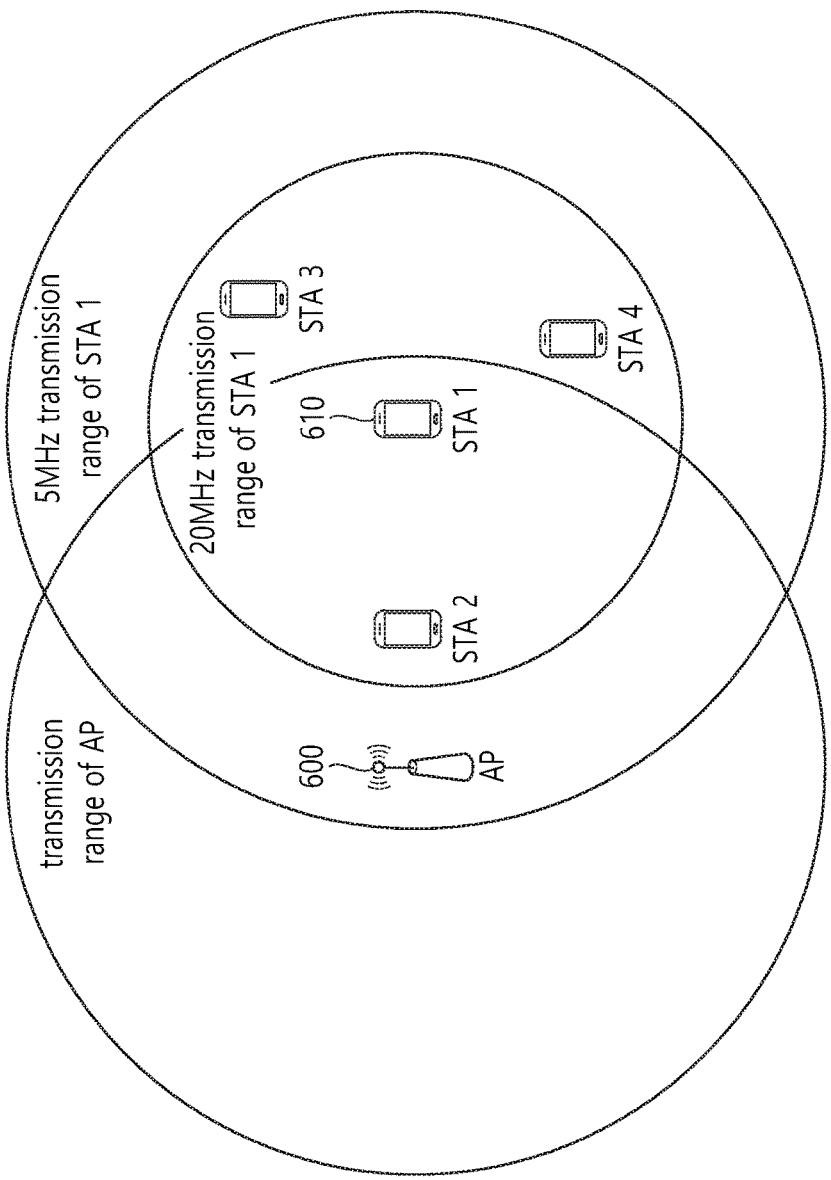
FIG. 6 illustrates a WLAN environment according to an embodiment of the present invention.

FIG. 6 illustrates a WLAN environment according to an embodiment of the present invention.

FIG. 6 discloses transmission coverage of an STA when the scanning/authentication/association procedure is performed on the basis of SU OFDM transmission within the bandwidth of 20 MHz and transmission coverage of an STA when uplink transmission is performed on the basis of UL MU OFDMA transmission within the bandwidth of 5 MHz.

Referring to FIG. 6, the AP 600 has transmission power relatively larger than STAs. For example, the downlink transmission coverage of the AP 600 through the bandwidth of 20 MHz may be larger than the transmission coverage of the STA through the bandwidth of 5 MHz. Therefore, coverage of the AP due to the transmission bandwidth may not be taken into account separately.

STA1 610 is located within the transmission coverage of the AP 600. If STA1 610 performs uplink transmission over the bandwidth of 20 MHz, the transmission coverage of STA1 610 may not include the AP 600. Therefore, it may be impossible for STA1 610 to perform uplink transmission to the AP 600 over the 20 MHz bandwidth at the current location. On the other hand, if STA1 610 performs uplink transmission over the bandwidth of 5 MHz, the transmission coverage of STA1 610 may include the AP 600. Therefore, it may be possible for STA1 610 to perform uplink transmission to the AP 600 over the bandwidth of 5 MHz at the current location.

If STA1 610 performs an initial access procedure based on SU OFDM over the bandwidth of 20 MHz, STA1 600 may perform passive scanning but is unable to perform active scanning. More specifically, passive scanning is performed by using beacon frames transmitted by the AP 600. Therefore, since STA1 610 is located within the range of downlink transmission, STA1 610 may perform passive scanning. On the other hand, active scanning may be performed by using probe request frames transmitted by the STA1 610. Therefore, since the AP 600 is not located within the range of uplink transmission of STA1 610 over the bandwidth of 20 MHz, active scanning may not be performed.

If STA1 610 performs the scanning procedure over the bandwidth smaller than 20 MHz (for example, 5 MHz), a probe request frame transmitted by SAT1 610 may be transmitted to the AP 600. Therefore, STA1 610 is capable of performing not only the passive scanning procedure but also the active scanning procedure. In what follows, in an embodiment of the present invention, disclosed will be a method for increasing the communication range between an AP and an STA by increasing the uplink transmission range of the STA which performs the initial access procedure.

In an embodiment of the present invention given below, bandwidth of 20 MHz and 5 MHz are used as examples for the convenience of description; however, the initial access procedure according to an embodiment of the present invention may be applied to the bandwidth of various other sizes different from the examples. The 20 MHz bandwidth may be expressed differently as first bandwidth while the 5 MHz bandwidth as second bandwidth, where the first bandwidth may be larger than the second bandwidth. Similarly, the 20 MHz bandwidth may be called a channel while the 5 MHz bandwidth a sub-channel (or sub-band) where the channel may include the sub-channel (or sub-band).

Figure 7:
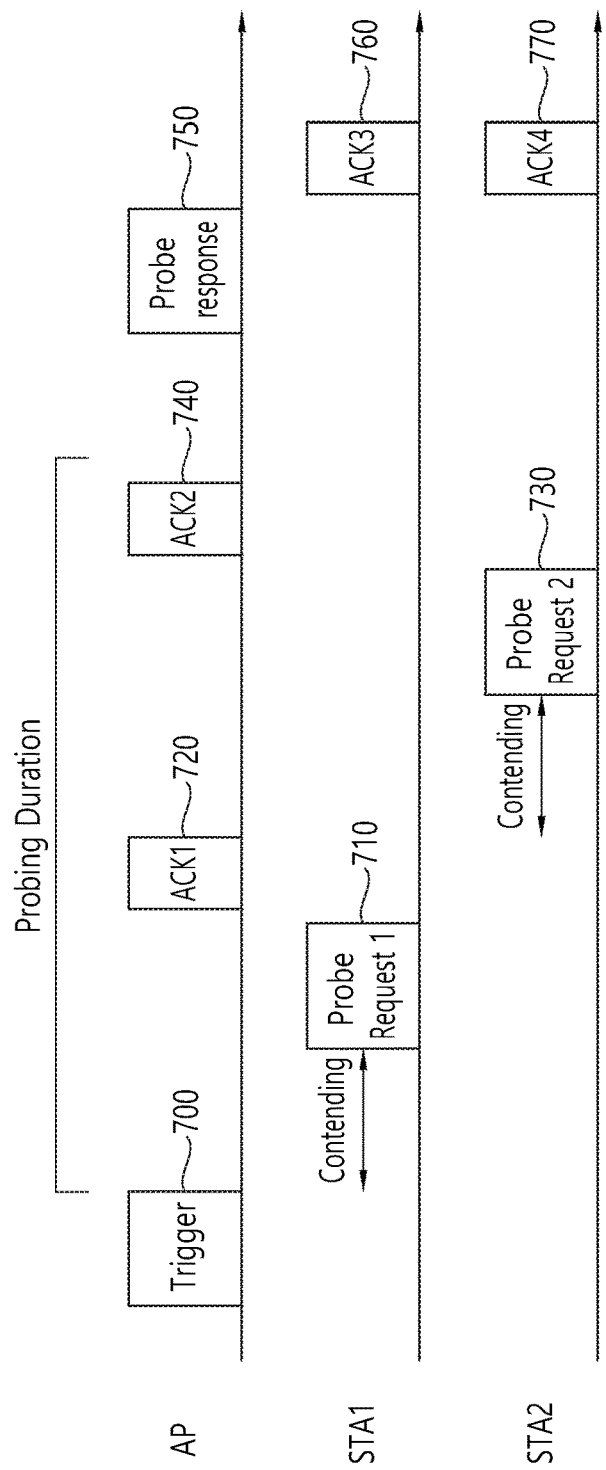
FIG. 7 illustrates an initial access method according to an embodiment of the present invention.

FIG. 7 illustrates an initial access method according to an embodiment of the present invention.

FIG. 7 discloses an active scanning method of an STA over the bandwidth (for example, 5 MHz) in sub-channel units.

Referring to FIG. 7, an STA may transmit a probe request frame over the bandwidth (for example, 5 MHz) in sub-channel units instead of transmitting the frame over the bandwidth (for example, 5 MHz) in channel units to increase the transmission distance of a probe request frame. The STA may transmit an initial access frame over the bandwidth in sub-channel units rather than the bandwidth in channel units even when UL MU OFDMA transmission is not performed.

The AP may transmit a trigger frame 700 for triggering each transmission of a plurality of probe request frames of a plurality of STAs. The trigger frame 700 transmitted by the AP may include information about duration (or probing duration) for the STA to transmit a probe request frame. The information about duration for an STA to transmit a probe request frame may be expressed by the term of probing duration information. The probing duration information may include information about the duration ranging from the time the AP transmits the trigger frame 700 (or the time the STA receives the trigger frame 700) to the time transmission of a probe request frame is made possible. The trigger frame 700 may be transmitted over the bandwidth in channel units (for example, 20 MHz).

At least one STA attempting initial access among a plurality of STAs which have received the trigger frame 700 may transmit a probe request frame to the AP. More specifically, an STA attempting to establish association or attempting to receive network information of the AP from among the STAs which have received the trigger frame may transmit a probe request frame to the AP during the configured probing duration. A plurality of STAs may transmit probe request frames to the AP in a sequential manner by using contention-based channel access. A probe request frame may be transmitted over the bandwidth in sub-channel units (for example, 5 MHz). If a probe request frame, which is transmitted over the bandwidth in channel units in the conventional WLAN system, is transmitted over the bandwidth in sub-channels, the transmission coverage of the probe request frame may be increased. Therefore, the disparity in the transmission ranges between an initial access frame and other frame may be removed, and frame transmission and reception coverage in the WLAN system may be increased.

The STA1 which has received the trigger frame 700 may transmit a probe request frame1 710 to the AP through contention-based channel access for the period of probing duration. The AP may transmit an ACK frame1 720 in response to the probe request frame1.

The STA2 which has received the trigger frame 700 may transmit a probe request frame2 730 to the AP through contention-based channel access for the period of probing duration. The AP may transmit an ACK frame2 740 in response to the probe request frame2 730.

In what follows, in the embodiment of the present invention an ACK frame may also be interpreted as a block ACK frame.

After termination of the probing duration, the AP may transmit a probe response frame in response to the probe request frame received in the probing duration. If a plurality of STAs transmit a plurality of probe request frames, the AP may transmit a probe response frame to the plurality of STAs on the basis of DL MU OFDMA transmission through downlink transmission. For example, if the AP receives the probe request frame1 710 and the probe request frame2 720 from STA1 and STA2 respectively, the AP may transmit an MU PPDU 750 including a probe response frame1 and probe response frame2 to the STA1 and STA2 respectively in response to the probe request frame1 710 and probe request frame2 720 on the basis of DL MU OFDMA transmission.

The STA1 and STA2 may transmit an ACK frame3 760 and ACK frame4 770 in response to the probe response frames through the MU PPDU 750 on the basis of UL MU OFDMA scheme.

Figure 8:
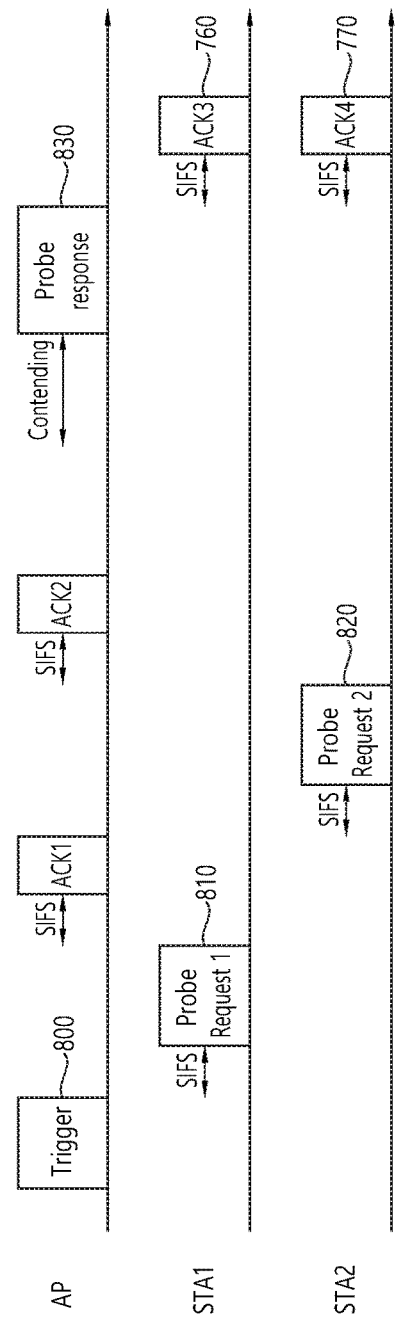
FIG. 8 illustrates an initial access method according to an embodiment of the present invention.

FIG. 8 illustrates an initial access method according to an embodiment of the present invention.

FIG. 8 discloses an active scanning method for an STA over the bandwidth in sub-channel units (for example, 5 MHz). In particular, FIG. 8 discloses a case in which transmission timing of a probe request frame is defined by separate frame intervals.

Referring to FIG. 8, being similar to the procedure disclosed in FIG. 7, the transmission timing of a probe request frame on a sub-channel may be defined by an interval between predetermined frames (for example, SIFS (Short InterFrame Space)) with respect to an ACK frame.

For example, the AP may perform transmission of a probe request frame based on the SIFS with respect to the transmission of the trigger frame 800. In the procedure of transmitting a probe request frame based on the trigger frame 800 disclosed in FIG. 8, the probing duration may not be defined separately. In this case, the trigger frame may not include the probing duration information.

The time interval between two frame transmitted on a medium (or channel) may be called an IFS (InterFrame Space). The priority of an STA occupying a radio medium may be determined on the basis of IFS having a different length from the others. A frame transmitted on a medium may be transmitted on the basis of IFS with a different length. For example, a different IFS may be used for frame transmission on the medium.

Of the IFS, calculation for SIFS, PIFS (PCF (Point Coordination Function) Interframe Space), and DIFS (DCF (Distributed Coordination Function) Interframe Space) may be performed by the mathematical equation 1, 2, and 3; the number in the parenthesis next to each parameter may be a numerical value taken generally for the corresponding parameter. The value of each parameter may vary for each STA. Each mathematical equation is disclosed in 9.3.7 DCF timing relation of the IEEE P802.11-REVmcTM/D2.0 draft disclosed in October 2013 and the parameters used for each equation are disclosed in 6.5.4 PLME-CHARACTERISTICS.confirm of the IEEE P802.11-REVmcTM/D2.0 document and 6.5 PLME SAP interface of the IEEE Std 802.11acTM-2013 document.

$$SIFS(16~\mu s)=aRxRFDelay(0.5)+aRxPLCPDelay\\(12.5)+aMACProcessingDelay(1~or~<2)+aRxTx\text{-}\\TurnaroundTime(<2)$$

$$aRxTxTurnaroundTime=aTxPLCPDelay(1)+aRxTx\text{-}\\SwitchTime(0.25)+aTxRampOnTime(0.25)+\\aTxRFDelay(0.5) \quad\quad\quad [\text{Eq. 1}]$$

Referring to Eq. 1, SIFS may correspond to the value determined by taking into account the delay in RF (Radio Frequency) stage, delay in the PLCP (Physical Layer Convergence Protocol) stage, MAC (Medium Access Control) processing delay, and time for transition from Rx to Rx. For example, SIFS may be the value representing the period ranging from the time the last symbol of a reception frame is received over the medium (or air interface) to the time the first symbol of a transmission frame is transmitted over the medium (or air interface).

$$PIFS(25~\mu s)=aSIFSTime+aSlotTime$$

$$aSlotTime=aCCATime(<4)+aRxTxTurnaroundTime\\(<2)+aAirPropagationTime(<1)+aMACPro\text{-}\\cessingDelay(<2) \quad\quad\quad [\text{Eq. 2}]$$

At this time, aAirPropagationTime may amount to twice the propagation time (or propagation delay) for signal transmission on the maximum distance between slot-synchronized STAs at the farthest distance within the communication range. Here, the aAirPropagationTime may be a value shorter than 1 µs. A radio wave may be propagated with a speed of 300 m/µs.

$$DIFS(34~\mu s)=aSIFSTime+2\times aSlotTime \quad\quad\quad [\text{Eq. 3}]$$

Referring to Eqs. 1 to 3, the values of SIFS, PIFS, and DIFS may vary according to the capability of an STA and/or wireless communication environment. For example, depending on the capability of an STA and/or wireless communication environment, SIFS may have a value of up to 16 µs, and PIFS may have a value of at least 16 µs and up to 25 µs.

In other words, the STA which has received the trigger frame 800 may transmit a probe request frame to the AP by taking into account the SIFS. For example, each of a plurality of STAs which have received the trigger frame 800 may determine the transmission order of a probe request frame in a random fashion and transmit the probe request frame according to the transmission order. For example, the STA1 which has received the trigger frame 800 may transmit the probe request frame1 810 on the basis of the SIFS. The AP which has received the probe request frame1 810 may transmit the ACK frame1, which is a response to the probe request frame1 810, to the STA1 on the basis of the SIFS.

The STA2 which has received the ACK frame1 may transmit a probe request frame2 820 to the AP on the basis of the SIFS. The AP which has received the probe request frame2 820 may transmit an ACK frame2, which is a response to the probe request frame2 820, to the STA2 on the basis fo the SIFS.

If there is no additional transmission of a probe request frame after transmission of the ACK frame (if there is no additional transmission of a probe request frame during the period set after transmission of the ACK frame), the AP may transmit a probe response frame to at least one STA which has transmitted the probe request frame. If a plurality of STAs transmit a plurality of probe request frames, the AP may transmit each of the plurality of probe response frames to each of the plurality of STAs through the MU PPDU 830 by using DL MU OFDMA transmission.

Each of a plurality of STAs may receive a plurality of probe response frames and transmit each of a plurality of ACK frames by using the MU PPDU through UL MU OFDMA transmission in response to the plurality of probe response frames.

If a plurality of probe request frames are transmitted on the overlapping time resources due to the same order setting for the plurality of STAs, the plurality of probe request frames may collide with each other. In this case, the AP fails to receive the probe request frame and is unable to transmit an ACK frame with respect to the probe request frame. Therefore, the STA which has failed to receive the ACK frame with respect to the probe request frame may consider the situation as a transmission failure of the probe request frame. Similarly, the STA which has failed to receive the ACK frame with respect to the probe request frame may determine that collision has occurred against the probe request frame.

If the AP does not receive the probe request frame for a predetermined time period (for example, SIFS) after transmission of a trigger frame, the AP may maintain TXOP (Transmission Opportunity) by re-transmitting the trigger frame.

FIG. 8 illustrates a situation in which each of the plurality of STAs determines the transmission order of the probe request frame in various ways. For example, by using the information included in the trigger frame, each of the plurality of STAs may determine the transmission order of the probe request frame, or the STA which has received the trigger frame itself may determine the transmission order of the probe request frame. The STA which has determined the transmission order of the probe request frame may determine the transmission timing of the probe request frame by taking into account the transmission order of the probe request frame. For example, the STA may determine the transmission timing of the probe request frame by taking into account the transmission timing of the probe request frame of other STA and the transmission timing of the ACK frame transmitted in response to the probe request frame. Or the STA may determine the transmission timing of the probe request frame by taking into account the defined interval between frames (for example, SIFS). Furthermore, each of the plurality of STAs may transmit the probe request frame in response to the trigger frame through contention-based channel access instead of determining the transmission order.

Figure 9:
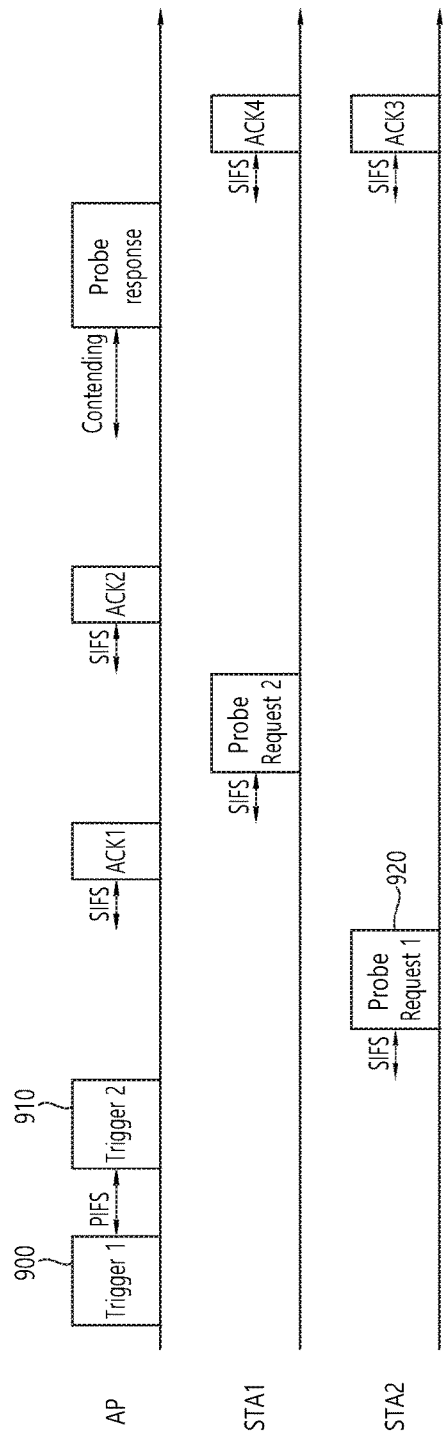
FIG. 9 illustrates an initial access method according to an embodiment of the present invention.

FIG. 9 illustrates an initial access method according to an embodiment of the present invention.

FIG. 9 discloses a procedure for re-transmitting a trigger frame triggering a probe request frame.

Referring to FIG. 9, after transmission of trigger frame1 900, trigger frame2 910 may be transmitted on the basis of PIFS. In other words, if the AP does not receive a probe request frame on the time resources based on the SIFS after transmitting the trigger frame1 900, the AP may transmit the trigger frame2 910 on the basis of PIFS.

For example, the AP may fail to receive a probe request frame due to the collision between a plurality of probe request frames transmitted on the overlapping time resources by each of the plurality of STAs. In this case, the AP may trigger transmission of the probe request frame again by re-transmitting the trigger frame.

The STA2 which has received the trigger frame2 910 may transmit the probe request frame1 920 to the AP by taking into account the SIFS. The subsequent procedure may be performed in the same manner as described with reference to FIG. 8. The number of re-transmissions of a trigger frame triggering the probe request frame may be limited.

In the case of FIG. 9, too, the initial access frame transmitted by the same STA which transmits the probe request frame may be transmitted on the sub-channel. Therefore, the transmission coverage of the initial access frame transmitted by the STA may be increased, and the disparity in the transmission ranges between the initial access frame and other frame may be removed.

Figure 10:
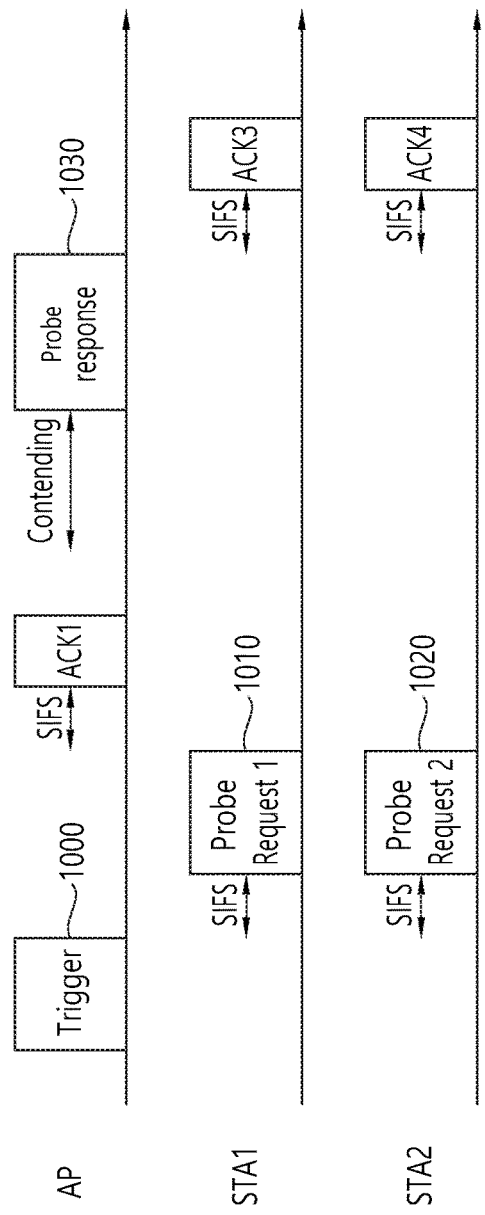
FIG. 10 illustrates an initial access method according to an embodiment of the present invention.

FIG. 10 illustrates an initial access method according to an embodiment of the present invention.

FIG. 10 discloses UL MU OFDMA transmission of a probe request frame by each of a plurality of STAs in response to a trigger frame.

Referring to FIG. 10, the AP may transmit a trigger frame 1000 to a plurality of STAs, STA1 and STA2. Each of the STA1 and STA2 which have received the trigger frame 1000 may transmit each of a plurality of probe response frames (for example, probe request frame1 1010 and probe request frame2 1020) according to the UL MU OFDMA transmission scheme through the MU PPDU in response to the trigger frame 1000. The frame interval between each of the plurality of probe request frames transmitted through the MU PPDU and the trigger frame may be SIFS.

A sub-channel for transmitting a probe request frame through the MU PPDU may be selected arbitrarily by the STA or determined by the information included in the trigger frame.

The AP which has received each of a plurality of probe request frames through the MU PPDU from a plurality of STAs may transmit the ACK frame to each of the plurality of STAs through the MU PPDU in response to each of the plurality of probe request frames.

Afterwards, the AP may transmit the MU PPDU 1030 which transmits each of the plurality of probe response frames in response to each of the plurality of probe request frames to the plurality of STAs through contention-based channel access.

Each of the plurality of STAs may transmit each of a plurality of ACK frames to the AP through the MU PPDU in response to each of the plurality of probe response frames.

In the case of FIG. 10, too, the initial access frame transmitted by the same STA which transmits the probe request frame may be transmitted on the sub-channel through the MU PPDU. Therefore, the transmission coverage of the initial access frame transmitted by the STA may be increased, and the disparity in the transmission ranges between the initial access frame and other frame may be removed.

If the active scanning method employing the probe request frame disclosed in FIGS. 7 to 10 is used, and a large number of STAs attempt to transmit the probe request frame, collision among probe request frames may occur frequently on a medium.

In what follows, disclosed will be a method for reducing collision between frames on a medium according to an embodiment of the present invention.

Figure 11:
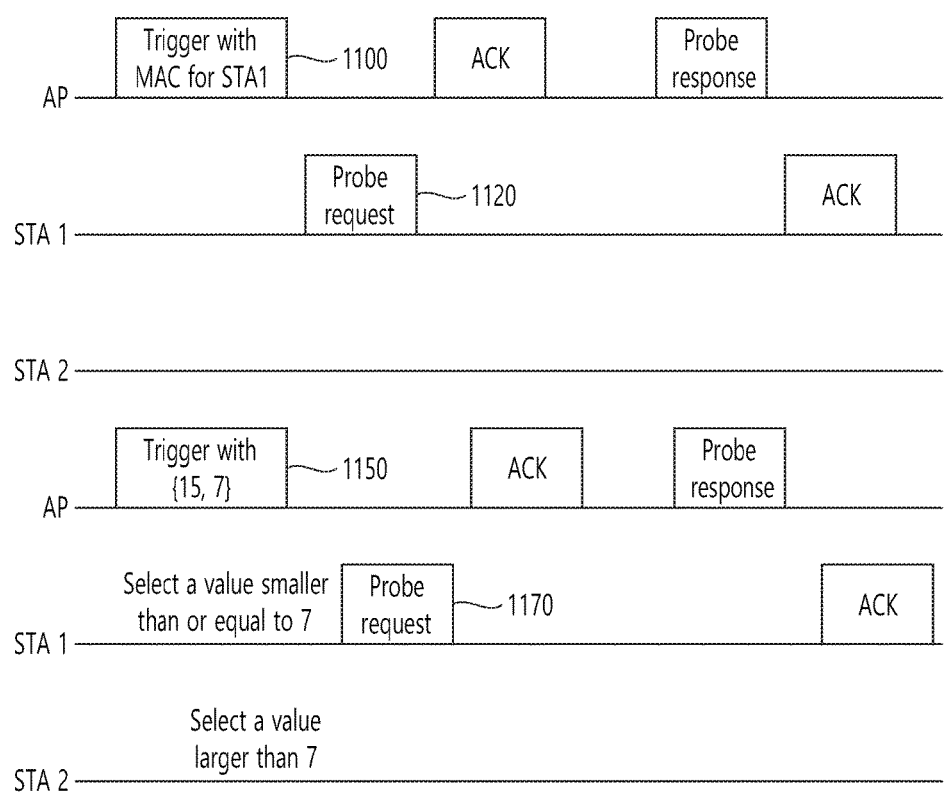
FIG. 11 illustrates a channel access method according to an embodiment of the present invention.

FIG. 11 illustrates a channel access method according to an embodiment of the present invention.

FIG. 11 discloses distribution of transmission resources of a frame with respect to a trigger frame. It may be necessary to distribute transmission resources of a frame to prevent collision between frames occurred on a medium The AP may set up an STA capable of transmitting a frame on a specific time resource on the basis of a trigger frame to distribute resource frames for each of a plurality of frames transmitted by each of a plurality of STAs. For example, identification information of an STA capable of transmitting a frame on a specific time resource with respect to a trigger frame (for example, MAC (Medium Access Control) address of the STA) may be transmitted.

The STA which has received the trigger frame may determine whether to transmit a probe request frame by taking into account the MAC address of the STA. If the MAC address of the STA corresponds to the MAC address indicated by the trigger frame, the STA may transmit the probe request frame. On the contrary, if the MAC address of the STA does not correspond to the MAC address indicated by the trigger frame, the STA may not transmit the probe request frame but may wait for the next trigger frame to be transmitted or change the operation channel to another channel.

Referring to the upper part of FIG. 11, as a specific example, the trigger frame 1100 may include the MAC address of STA1 but may not include the MAC address of STA2. In this case, of the STA1 and STA2 which have received the trigger frame1, only the STA1 may transmit the probe request frame 1120 in response to the trigger frame 1100.

Not only the STA1 but also the other STA the MAC address of which has been indicated by the trigger frame may transmit a probe request frame on the basis of the trigger frame. Each of the STA1 and another STA may transmit the probe request frame on the sub-channel allocated through the MU PPDU. Therefore, a problem due to the disparity in the transmission ranges between the initial access frame and other frame may be solved.

In another method for preventing collision among frames occurred on a medium, the AP may transmit random value information for determining transmission of a probe request frame on the basis of a trigger frame. For example, the AP may transmit {15, 7} through the trigger frame as the transmission random value information with which to determine transmission of a frame. The transmission random value information {15, 7} may be the information for inducing the STA which has selected a value smaller than or equal to 7 from among the integer values ranging from 0 to 15 to perform transmission.

The STA which has received the transmission random value information {15, 7} may select one of the integer values ranging from 0 to 15 by using a random function, and if the value selected by the random function is smaller than or equal to 7, the STA may transmit the probe request frame on the basis of the trigger frame. If such a method as described above is used, time resources for transmitting each of a plurality of probe request frames transmitted by each of the plurality of STAs may be distributed, and collision between probe request frames on a medium may be reduced.

Referring to the lower part of FIG. 11, as a specific example, it is assumed that STA1 selects a value smaller than or equal to 7, and STA2 selects a value larger than 7 on the basis of the transmission random value information {15, 7} included in the trigger frame 1150. In this case, only the STA1 may transmit the probe request frame 1170 in response to the trigger frame 1150.

Not only the STA1 but also others STA which have selected a value smaller than or equal to 7 may transmit the probe request frame on the basis of the trigger frame. Each of the STA1 and the other STAs may transmit the probe request frame on the allocated sub-channel through the MU PPDU. Therefore, a problem due to the disparity in the transmission ranges between the initial access frame and other frame may be solved.

Figure 12:
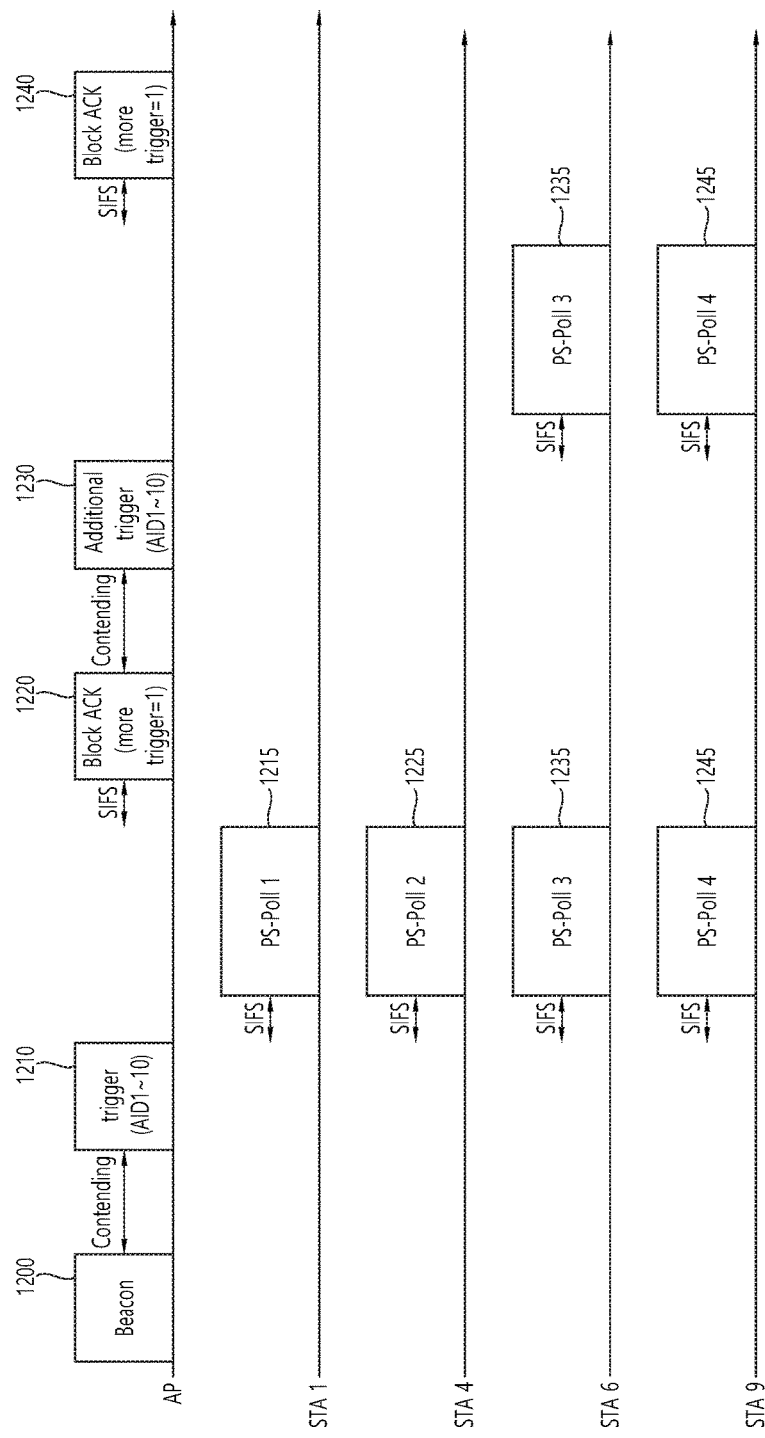
FIG. 12 illustrates a channel access method according to an embodiment of the present invention.

FIG. 12 illustrates a channel access method according to an embodiment of the present invention.

FIG. 12 discloses a procedure in which a plurality of STAs connected to an AP receive a beacon frame and a trigger frame and transmit a PS (Power Save)-poll frame.

Referring to FIG. 12, the AP may indicate existence of buffered data for each of STA1, STA4, STA6, and STA9 on the basis of TIM (Traffic Indication Map) of the beacon frame 1200. Each of the STA1, 4, 6, and 9 may indicate the AID (Association Identifier) of a terminal. More specifically, the bitmap included in the TIM element may indicate existence of pending (or buffered) downlink data for each of the connected STAs.

After transmission of the beacon frame 1200, the AP may transmit the trigger frame 1210. The trigger frame 1210 may include information for distributing transmission of a plurality of PS-poll frames transmitted by a plurality of STAs. For example, the trigger frame 1210 may include information about the AID of the STA capable of transmitting a PS-poll frame in response to the trigger frame 1210. The information about the AID of the STA capable of transmitting a PS-poll frame may be expressed by the term of PS-poll frame transmission STA information.

The PS-poll frame transmission STA information included in the trigger frame 1210 may indicate AID1 to AID10. In other words, the STA with an AID corresponding to the AID1 to AID10 may transmit a PS-poll frame in response to the trigger frame 1210.

Each of a plurality of STAs which has received an indication of buffered data on the basis of TIM may receive the trigger frame 1210, compare the AID indicated by the PS-poll frame transmission STA information included in the trigger frame 1210 with the AID of each of the plurality of STAs, and determine whether to transmit the PS-pol frame.

Since the PS-poll frame transmission STA information included in the trigger frame 1210 indicates the AID1 to AID10, each of STA1, STA4, STA6, and STA9 may transmit the PS-poll frame in response to the trigger frame 1210.

Each of the STA1, STA4, STA6, and STA9 may select a resource in a random fashion and transmit each of the plurality of PS-poll frame through the MU PPDU. For example, each of the STA1, STA4, STA6, and STA9 may transmit each of the plurality of PS-poll frames to the AP through each of a plurality of sub-channels or each of a plurality of space-time stream (or a plurality of spatial streams) according to UL MU OFDMA and UL MU MIMO transmission.

As a specific example, if UL MU OFDMA transmission is used for transmission of each of the plurality of PS-poll frames, STA1 may transmit the PS-poll frame1 1215 through the sub-channel 1, STA2 may transmit the PS-poll frame2 1225 through the sub-channel 2, STA3 may transmit the PS-poll frame3 1235 through the sub-channel 3, and STA4 may transmit the PS-poll frame4 1245 through the sub-channel 4 on the basis of the MU PPDU.

As another example, if UL MU MIMO transmission is used for transmission of each of the plurality of PS-poll frames, STA1 may transmit the PS-poll frame1 1215 through space-time stream 1, STA2 may transmit the PS-poll frame2 1225 through space-time stream 2, STA3 may transmit the PS-poll frame3 1235 through space-time stream 3, and STA4 may transmit the PS-poll frame4 1245 through space-time stream 4 on the basis of the MU PPDU.

Transmission failure (or reception failure) may occur for at least one PS-poll frame among the plurality of PS-poll frames transmitted by a plurality of STAs. The AP may perform a procedure for receiving the failed PS-poll frame again on the basis of re-transmission of the trigger frame.

For example, it may be assumed that the AP may succeed to receive the PS-poll frame1 1215 transmitted by STA1 and the PS-poll frame2 1225 transmitted by STA4 but fail to receive the PS-poll frame3 1235 transmitted by STA6 and the PS-poll frame4 1245 transmitted by STA9.

The AP may indicate buffered downlink data on the basis of TIM and determine existence of an STA which has not transmitted the PS-poll frame from among a plurality of STAs which have triggered transmission of the PS-poll frame. If there exists an STA which has not transmitted the PS-poll frame, the AP may transmit the trigger frame additionally to trigger the PS-poll frame again. An ACK frame transmitted in response to the PS-poll frame may be used to indicate whether the AP additionally transmits the trigger frame. In what follows, a trigger frame additionally transmitted is expressed by the term of an additional trigger frame.

The AP may receive the PS-poll frame1 1215 transmitted by STA1 and PS-poll frame2 1225 transmitted by STA4; and transmit a block ACK frame1 1220 in response to the PS-poll frame1 1215 and the PS-poll frame2 1225 transmitted by STA4. The block ACK frame1 1220 may include information indicating whether to transmit the additional trigger frame 1230. The information indicating additional transmission of the trigger frame may comprise more trigger bits. For example, the AP may set the more trigger bit to 1 and transmit the additional trigger frame 1230. On the contrary, the AP may set the more trigger bit to 0 and may not transmit the additional trigger frame 1230. The more data bit or retry bit of a frame control field included in the block ACK frame not defined in an existing block ACK frame may be used as the more trigger bit.

The STA supposed to transmit the PS-poll frame indicated by the additional trigger frame 1230 may be changed when compared with the STA supposed to transmit the PS-poll frame indicated by the trigger frame 1210 transmitted previously.

For example, the range of AIDs indicated by the PS-poll frame transmission STA information to be included in the additional trigger frame 1230 may be reduced when compared with the range of AIDs indicated by the PS-poll frame transmission STA information included in the previous trigger frame 1210.

If the AID range indicated by the PS-poll frame transmission STA information included in the additional trigger frame 1230 is relatively reduced, collision among PS-poll frames triggered by the additional trigger frame 1230 may be reduced. The AP may reduce the AID range to be indicated by the PS-poll frame transmission STA information to be included in the additional trigger frame 1230 by taking into account the bitmap of the TIM element transmitted previously. Or the AP may reduce the AID range to be indicated by the PS-poll frame transmission STA information to be included in the additional trigger frame 1230 by taking into account the information about the STA which has succeeded to transmit the PS-poll frame.

Referring to FIG. 12, the additional trigger frame 1230 may reduce the PS-poll frame transmission STA information to AID6 to AID10. In this case, each of the STA 6 and STA 9 may re-transmit the PS-poll frame3 1235 and PS-poll frame4 1245 on the basis of the MU PPDU by using the additional trigger frame.

The AP may receive the PS-poll frame2 1235 and PS-poll frame4 1245 transmitted by each of the STA6 and STA9; and transmit the block ACK frame2 1240 in response to the PS-poll frame3 1235 and PS-poll frame4 1245.

If the AP attempts to receive the PS-poll frame additionally, the AP may set the more trigger bit of the block ACK frame2 1240 again to 1. If the more trigger bit of the block ACK frame2 1240 is set to 1, another additional trigger frame may be transmitted again to trigger transmission of the PS-poll frame.

According to another embodiment of the present invention, an STA supposed to transmit the PS-poll frame may be indicated by a beacon frame.

For example, the STA to transmit the PS-poll frame may be designated by the value indicated by a specific field (for example, DTIM (Delivery Traffic Indication Map) count field) of the TIM element included in the beacon frame. For example, if the value of the specific field of the TIM element is 0, AID0 to AID10 may be indicated while, if the value of the specific field of the TIM element is 1, AID11 to AID20 may be indicated.

Similarly, the beacon frame may indicate the range of AIDs of an STA supposed to transmit the PS-poll frame within the TBTT (Target Beacon Transmission Time) interval. Or the AID of an STA supposed to transmit the PS-poll frame may be determined on the basis of the information about transmission (or reception) time of the beacon frame by using the TSF (Time Synchronization Function) value.

Figure 13:
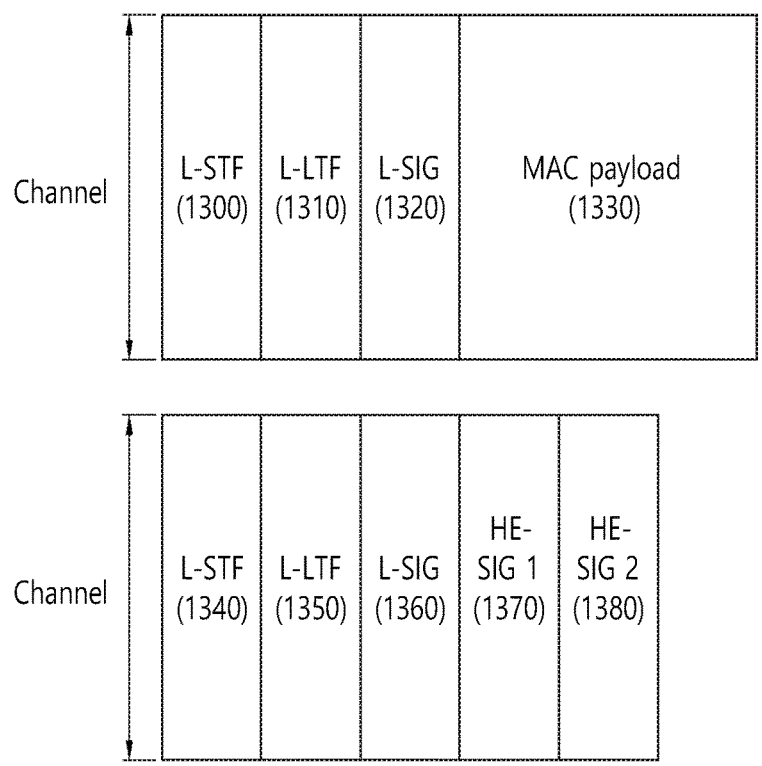
FIG. 13 illustrates a PPDU delivering a trigger frame according to an embodiment of the present invention.

FIG. 13 illustrates a PPDU delivering a trigger frame according to an embodiment of the present invention.

FIG. 13 discloses a PPDU delivering a trigger frame triggering a probe request frame (or a PS-poll frame or a data frame).

In the upper part of FIG. 13, disclosed is a PPDU delivering a trigger frame.

A PPDU delivering a trigger frame may include a PPDU header and an MPDU. A PPDU header may include an L-STF (Legacy-Short Training Field) 1300, L-LTF (Legacy-Long Training Field) 1310, and L-SIG (Legacy-Signal) 1320.

An STA located within the transmission coverage of a trigger frame of an AP (an STA supporting UL MU OFDMA/UL MU MIMO according to an embodiment of the present invention) may be capable of decoding of the L-STF 1300, L-LTF 1310, and L-SIG 1320 included in the trigger frame. The TXOP (Transmission Opportunity) for the trigger frame may be protected on the basis of the STA's decoding of the L-STF 1300, L-LTF 1310, and L-SIG 1320.

The L-STF 1300 may include a short training orthogonal frequency division multiplexing (OFDM) symbol. The L-STF 1300 may be used for frame detection, AGC (Automatic Gain Control), diversity detection, and coarse frequency/time synchronization.

The L-LTF 1310 may include a long training orthogonal frequency division multiplexing (OFDM) symbol. The L-LTF 1310 may be used for fine frequency/time synchronization and channel estimation.

The L-SIG 1320 may be used for transmitting control information. The L-SIG 1320 may include information about data rate and data length.

The MPDU 1330 may include probing duration information, trigger period information, and trigger frame type information.

The probing duration information may include information about the length of probe duration. The length of probe duration may indicate the duration for an STA to transmit a probe request information. In other words, the probing duration information may include the information of duration ranging from the time an AP transmits a trigger frame (or the time an STA receives a trigger frame) to the time transmission of a probe request frame is made possible.

If length of the probe duration is not set up by the probing duration information, the STA may transmit a probe request frame after transmitting the trigger frame without being restricted by the transmission duration. Also, the initial access procedure of the STA located at a long distance from the AP (for example, transmission of a probe request frame and association procedure) may be stopped according to the value set to the length of the probe duration, and network utilization may be improved. For example, if the length of the probe duration is set to 0, the initial access procedure for an STA located at a long distance from the AP may be restricted.

The probing duration information is used for limiting the transmission period of the probe request frame. For most cases, if a trigger frame triggers transmission of other frame, the transmission period of the triggered frame may be configured by the trigger frame. In this case, instead of the term of probing duration information, the term of triggered frame duration information may be used, and the triggered frame duration information may include information about the transmission period of a frame triggered by the trigger frame.

The trigger period information may include information about the transmission period of a trigger frame. A trigger frame may be transmitted at a predetermined period, and the trigger period information may include the information about transmission timing of the trigger frame.

An STA, which has failed to transmit a probe request frame on the basis of a transmitted trigger frame, may re-transmit the probe request fame after receiving the next trigger frame by taking into account the trigger period information.

The trigger frame type information may include the information about a frame triggered by the trigger frame. As described above, the trigger frame may be used for triggering transmission of a probe request frame, PS-poll frame, and so on. More specifically, the trigger frame type information may include information indicating whether the frame the transmission of which is triggered by the trigger frame is a probe request frame; an association request frame; or a frame for UL MU MIMO transmission or UL MU OFDMA transmission through the uplink.

Referring to the lower part of FIG. 13, the trigger frame may be defined by the PPDU header only. If the trigger frame is defined by the PPDU header only, the trigger frame may also be expressed by the term of trigger packet. A trigger packet may include the L-STF 1340, L-LTF 1350, L-SIG 1360, HE-SIG1 (High Efficiency-Signal1) 1370, and HE-SIG2 (High Efficiency-Signal2) 1380.

The HE-SIG1 1370 may include information for decoding of the HE-SIG2 1380. The HE-SIG1 1370 may include information about the resource to which the trigger packet transmitting a PPDU is transmitted (frequency resource (or sub-channel)) (in the case of UL MU OFDMA based transmission) or space-time stream resource (in the case of UL MU MIMO based transmission). Also, the HE-SIG1 1370 may include MCS (Modulation and Coding Scheme) information about the HE-SIG2 1380, information about the number of symbols for the HE-SIG2 1380, and information about CP (Cyclic Prefix) (or GI (Guard Interval)) length.

Also, the HE-SIG1 1370 may include information about color bits for BSS identification, bandwidth information, tail bit, and CRC (Cyclic Redundancy Code) bit.

The HE-SIG2 1380 may include the probing duration information, trigger period information, and trigger frame type information described above.

According to an embodiment of the present invention, the beacon frame may perform the role of a trigger frame. STAs may receive a beacon frame or transmit an initial access frame (for example, a probe request frame or an association request frame) if additional information is needed or to perform the initial access procedure (for example, the association procedure). The beacon frame, which is transmitted at each beacon transmission time (TBTT), may not perform the role of the trigger frame, but a beacon frame which performs the role of the trigger frame may be transmitted according to a newly set period (for example, the transmission period of three beacon frames (three times the TBTT)).

The beacon frame may include the information about the trigger frame to be transmitted subsequently. For example, the beacon frame may include the transmission period of the trigger frame and information about transmission time. An STA may obtain the information about the transmission time of the trigger frame on the basis of the beacon frame.

Also, the HE-SIG2 1380 may include the length of the PSDU (Physical Layer Service Data Unit) (or MPDU) for each STA, information about the MCS, and tail bit. Also, the HE-SIG2 may include information about the STA supposed to receive the PPDU and resource allocation information based on OFDMA transmission (or resource allocation information based on the MU-MIMO transmission).

Figure 14:
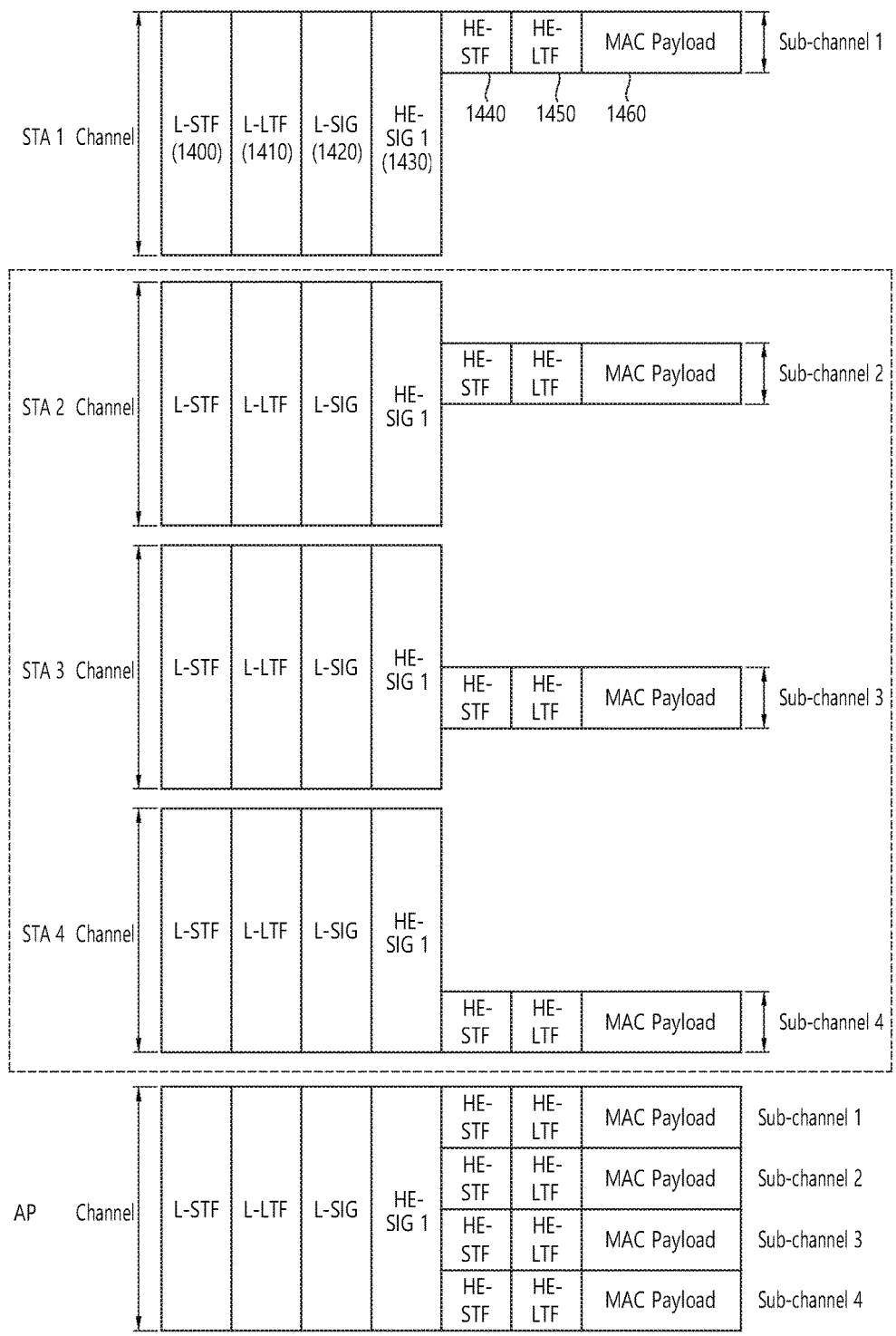
FIG. 14 illustrates a PPDU delivering a probe request frame according to an embodiment of the present invention.

FIG. 14 illustrates a PPDU delivering a probe request frame according to an embodiment of the present invention.

FIG. 14 discloses a probe request frame transmitted through the MU PPDU according to the MU OFDMA transmission.

Referring to FIG. 14, a probe request frame may include the L-STF 1400, L-LTF 1410, L-SIG 1420, HE-SIG1 1430, HE-STF 1440, HE-LTF 1450, and MAC payload 1460. The L-STF 1400, L-LTF 1410, L-SIG 1420, and HE-SIG1 1430 may be transmitted in channel units while the HE-STF 1440, HE-LTF 1450, and MAC payload 1460 may be transmitted in sub-channel units.

The L-STF 1400, L-LTF 1410, and L-SIG 1420 may perform the role as disclosed in FIG. 13. The STA located within the transmission coverage of the probe request frame of the AP may be capable of decoding the L-STF 1400, L-LTF 1410, and L-SIG 1420 included in the probe request frame. The TXOP for the probe request frame may be protected on the basis of decoding of the L-STF 1400, L-LTF 1410, and L-SIG 1420.

The HE-SIG1 1430 may include the information for decoding the HE-STF 1440, HE-LTF 1450, and MAC payload 1460. The HE-SIG1 1430 may include the information obtained on the basis of the trigger frame, color bit information for BSS identification, or bandwidth information.

The HE-STF 1440 may be used for improving automatic gain control estimation in the MIMO or OFDMA environment.

The HE-STF 1450 may be used for estimating a channel in the MIMO or OFDMA environment.

The MAC payload (or MPDU) 1460 may include the information element (or field) included in the MAC payload of an existing probe request frame.

According to an embodiment of the present invention, the probe request frame may include information requesting a trigger frame triggering immediate transmission of an association request frame.

The association intent information included in the probe request frame may be used for requesting a trigger frame triggering an association request frame from the AP. If the association intent information is 1, the STA may request a trigger frame for transmitting the association request frame. If the STA is already aware of the information about a network (for example, if the STA receives a beacon frame), the STA may request to immediately perform the association procedure with the AP by including an association intent indicator in the probe request frame.

The AP which has received a probe request frame including the association intent information requesting the association procedure may not transmit a probe response frame but transmit to the STA a trigger frame triggering the STA to transmit the association request frame. The association intent information may be included in the signal field (HE-SIG1, HE-SIG2) of the PPDU delivering the probe request frame or in the MAC payload.

The upper part of FIG. 14 discloses a probe request frame transmitted by one STA through the MU PPDU format on one sub-channel (for example, sub-channel 1). In the same way, the probe request frame may be transmitted by a different STA through another sub-channel.

The middle part of FIG. 14 discloses a probe request frame transmitted by other STAs (STA2, STA3, and STA4) through the MU PPDU on other sub-channels (for example, sub-channel2, sub-channel3, and sub-channel4). In the MU-PPDU transmitted by each of the other STAs, the L-STF to HE-SIG1 may include the same information. The HE-STF, HE-LTF, and MAC payload transmitted after the HE-SIG1 field may be different from each other, and each of a plurality of probe request frames transmitted by the other STAs may be transmitted on the respective sub-channels.

The lower part of FIG. 14 discloses a plurality of probe request frames transmitted through each of a plurality of sub-channels by the respective STAs, as seen with respect to the AP.

The AP may receive each of a plurality of probe request frames through each of the sub-channel 1 to the sub-channel 4 on the basis of the MU PPDU disclosed in the upper and middle part of FIG. 14.

As described above, the STA may arbitrarily determine a sub-channel for transmitting the probe request frame or determine the sub-channel on the basis of the information included in the trigger frame.

If the probe request frame is transmitted on the non-overlapping time resources through the SU (Single User) PPDU as illustrated in FIG. 7, the PPDU including the L-STF, L-LTF, L-SIG, HE-STF, HE-LTF, and MAC payload may be transmitted on a sub-channel.

Figure 15:
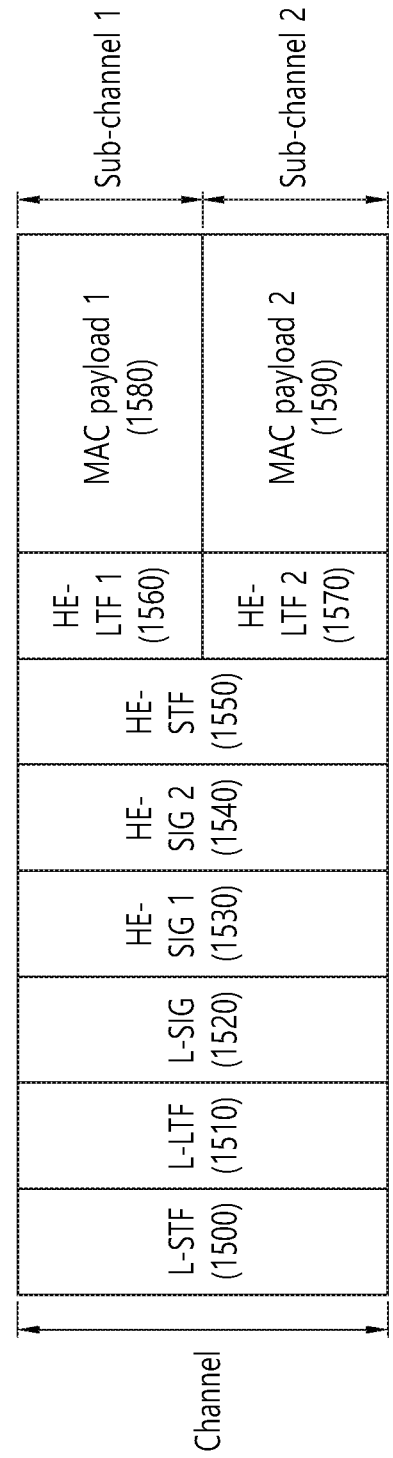
FIG. 15 illustrates a PPDU delivering a probe response frame according to an embodiment of the present invention.

FIG. 15 illustrates a PPDU delivering a probe response frame according to an embodiment of the present invention.

Referring to FIG. 15, the PPDU delivering a probe response frame may include L-STF 1500, L-LTF 1510, L-SIG 1520, HE-SIG1 1530, HE-SIG2 1540, HE-STF 1550, HE-LTF1 1560, HE-LTF2 1570, and MAC payload1 1580, MAC payload2 1590.

The L-STF 1500, L-LTF 1510, and L-SIG 1520 may include the information as described in FIG. 13 and perform the role as described in FIG. 13. The STA located within the transmission coverage of the probe response frame of the AP may be capable of decoding the L-STF 1500, L-LTF 1510, and L-SIG 1520 included in the probe response frame. The TXOP for the probe response frame may be protected on the basis of decoding of the L-STF 1500, L-LTF 1510, and L-SIG 1520.

The HE-SIG1 1530 and HE-SIG2 1540 may also include the information as described in FIG. 13 and perform the role as described in FIG. 13.

For example, the HE-SIG1 1530 may include the information for decoding of the HE-SIG2 1540, HE-STF 1550, HE-LTF1 1560/HE-LTF2 1570, and MAC payload1 1580/MAC payload2 1590; and the HE-SIG2 1540 may include the information about resource allocation of the current frame.

The HE-STF 1550 may be used for improving automatic gain control estimation in the MIMO or OFDMA environment.

The HE-LTF1 1560/HE-LTF2 1570 may be used for estimating a channel in the MIMO or OFDMA environment.

The HE-STF 1550 may be transmitted on a channel (for example, 20 MHz) including a plurality of sub-channels, and the HE-LTF1 1560/HE-LTF2 1570 may be transmitted on a sub-channel (for example, 10 MHz).

Each of a plurality of MAC payloads (or MPDUs) may be transmitted through each of a plurality of sub-channels and include an information element (or field) included in the MAC payload of an existing probe response frame. The MAC payload1 1580 may be transmitted through the sub-channel 1, and the MAC payload2 1590 may be transmitted through the sub-channel2.

As described above, the AP may transmit a trigger frame for immediately triggering an association request frame instead of the probe response frame.

If the STA request a trigger frame for triggering an association request frame on the basis of the association request information included in the probe request frame, the AP may not have to transmit the probe response frame information again, which, in this case, the information of the existing probe response frame may be omitted.

Figure 16:
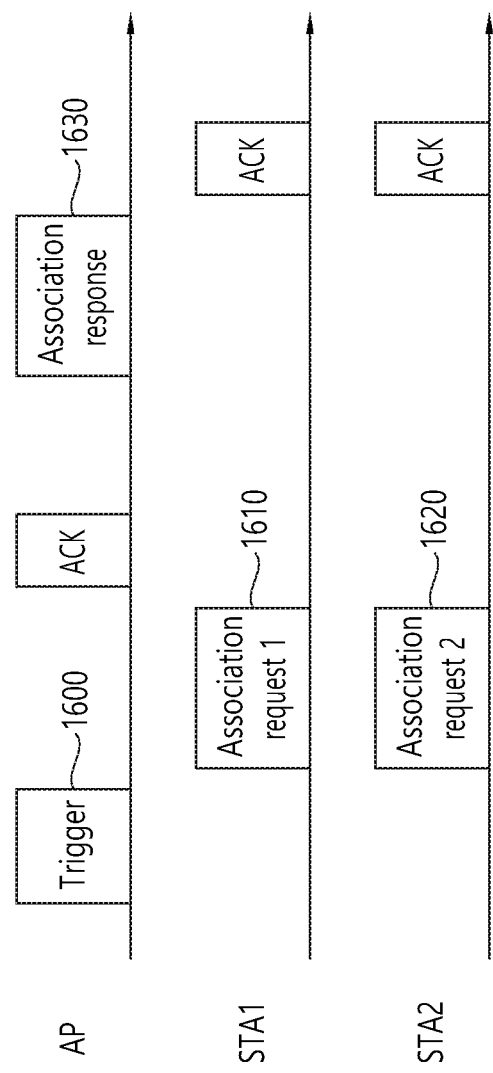
FIG. 16 illustrates an association procedure according to an embodiment of the present invention.

FIG. 16 illustrates an association procedure according to an embodiment of the present invention.

FIG. 16 illustrates a case in which a plurality of STAs and an AP perform an association procedure.

Referring to FIG. 16, the AP may allocate a virtual AID (or temporary AID) to the STA and trigger an association request frame by using the temporary AID. In other words, the STA may perform the association procedure by using the temporary AID. Information about the temporary AID may be allocated by being included in the probe response frame.

For example, the trigger frame 1600 triggering the association request frame may indicate the STA supposed to transmit the association request frame by using the temporary AID and allocate a resource to the STA supposed to transmit the association request frame.

The plurality of STAs which have received the trigger frame 1600 triggering the association request frame may transmit the association request frame through the resource allocated on the basis of the temporary AID. For example, the association request frame1 1610 transmitted by the STA1 and the association request frame2 1620 transmitted by the STA2 may be transmitted according to the UL MU OFDMA scheme through the MU PPDU.

The AP may receive a plurality of association request frames through the MU PPDU and transmit a plurality of ACK frames in response to the plurality of association request frames through the MU PPDU according to the DL MU OFDMA scheme.

Afterwards, the AP may transmit the plurality of association response frames to the STA1 and STA2 through the MU PPDU 1630 according to the DL MU OFDMA scheme.

The STA1 and STA2 may transmit a plurality of ACK frames in response to the association response frame through the MU PPDU according to the UL MU OFDMA scheme.

Also, according to an embodiment of the present invention, the STA may transmit an association request frame through SU-OFDM transmission without using the temporary AID. In the same way as the method for transmitting a probe request frame of FIGS. 7 to 9, each of a plurality of STAs may transmit the association request frame sequentially through the SU OFDM transmission.

If an STA performs passive scanning based on a beacon frame, information about the network may be obtained through the beacon frame. If passive scanning is performed, a temporary AID may not be allocated on the basis of the probe response frame. In this case, the STA may transmit the association request frame through the SU OFDM transmission on the basis of the trigger frame without taking into account the temporary AID.

Figure 17:
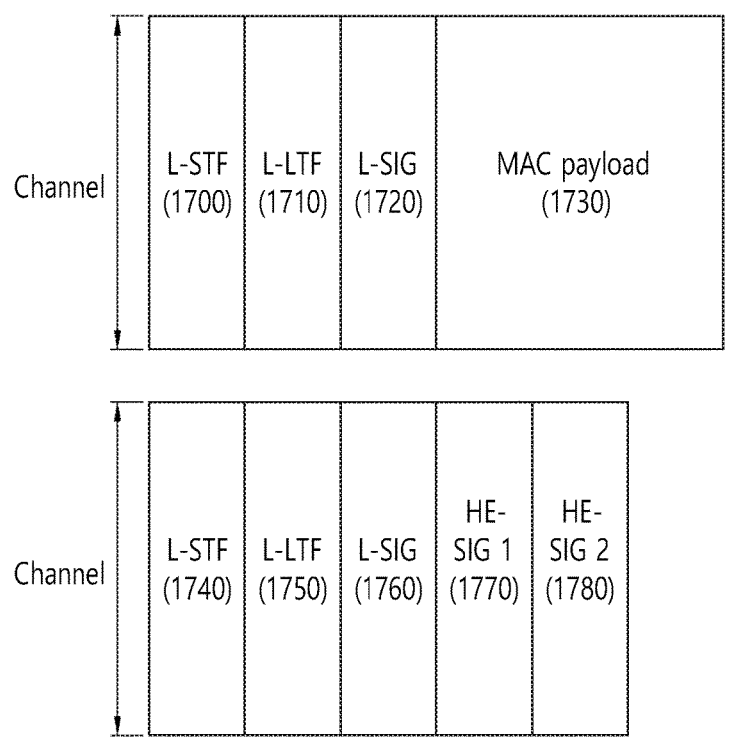
FIG. 17 illustrates a PPDU delivering a trigger frame according to an embodiment of the present invention.

FIG. 17 illustrates a PPDU delivering a trigger frame according to an embodiment of the present invention.

FIG. 17 discloses a trigger frame triggering transmission of an association request frame disclosed in FIG. 16.

Referring to the upper part of FIG. 17, a PPDU delivering a trigger frame is disclosed.

The PPDU delivering a trigger frame may include a PPDU header and an MPDU. The PPDU header may include the L-STF 1700, L-LTF 1710, and L-SIG 1720.

The L-STF 1700, L-LTF 1710, and L-SIG 1720 may include the information as described in FIG. 13 and may perform the role as described in FIG. 13. An STA located within the transmission coverage of a trigger frame of an AP may be capable of decoding of the L-STF 1700, L-LTF 1710, and L-SIG 1720 included in the trigger frame. The TXOP for the trigger frame may be protected on the basis of the decoding of the L-STF 1700, L-LTF 1710, and L-SIG 1720.

The MAC payload (or MPDU) 1730 may include the information element (or field) included in the MAC payload 1730 of the trigger frame. For example, the MAC payload 1730 may include the resource allocation information and trigger frame type information.

The resource allocation information may include the information about resource allocation for transmission of the association request frame based on UL MU OFDMA transmission of each of a plurality of STAs. For example, the resource allocation information may include information about allocation of a sub-channel for transmission of the association request frame corresponding to the temporary AID allocated to each of the plurality of STAs.

The trigger frame type information may include the information about a frame triggered by the trigger frame. As described above, the trigger frame may be used for triggering transmission of a probe request frame, PS-poll frame, and so on. For example, the trigger frame type information may include information indicating whether the frame the transmission of which is triggered by the trigger frame is a probe request frame; an association request frame; or a frame for UL MU MIMO transmission or UL MU OFDMA transmission.

Referring to the lower part of FIG. 17, the trigger frame may be defined by the PPDU header only. If the trigger frame is defined by the PPDU header only, the trigger frame may also be expressed by the term of trigger packet. A trigger packet may include the L-STF 1740, L-LTF 1750, L-SIG 1760, HE-SIG1 1770, and HE-SIG2 1780.

The HE-SIG1 1770 and HE-SIG2 1780 may also include the information as described in FIG. 13 and perform the role as described in FIG. 13.

For example, the HE-SIG1 1770 may include the information for decoding of the HE-SIG2 1780, and the HE-SIG2 1780 may include the resource allocation information and trigger frame type information described above.

Figure 18:
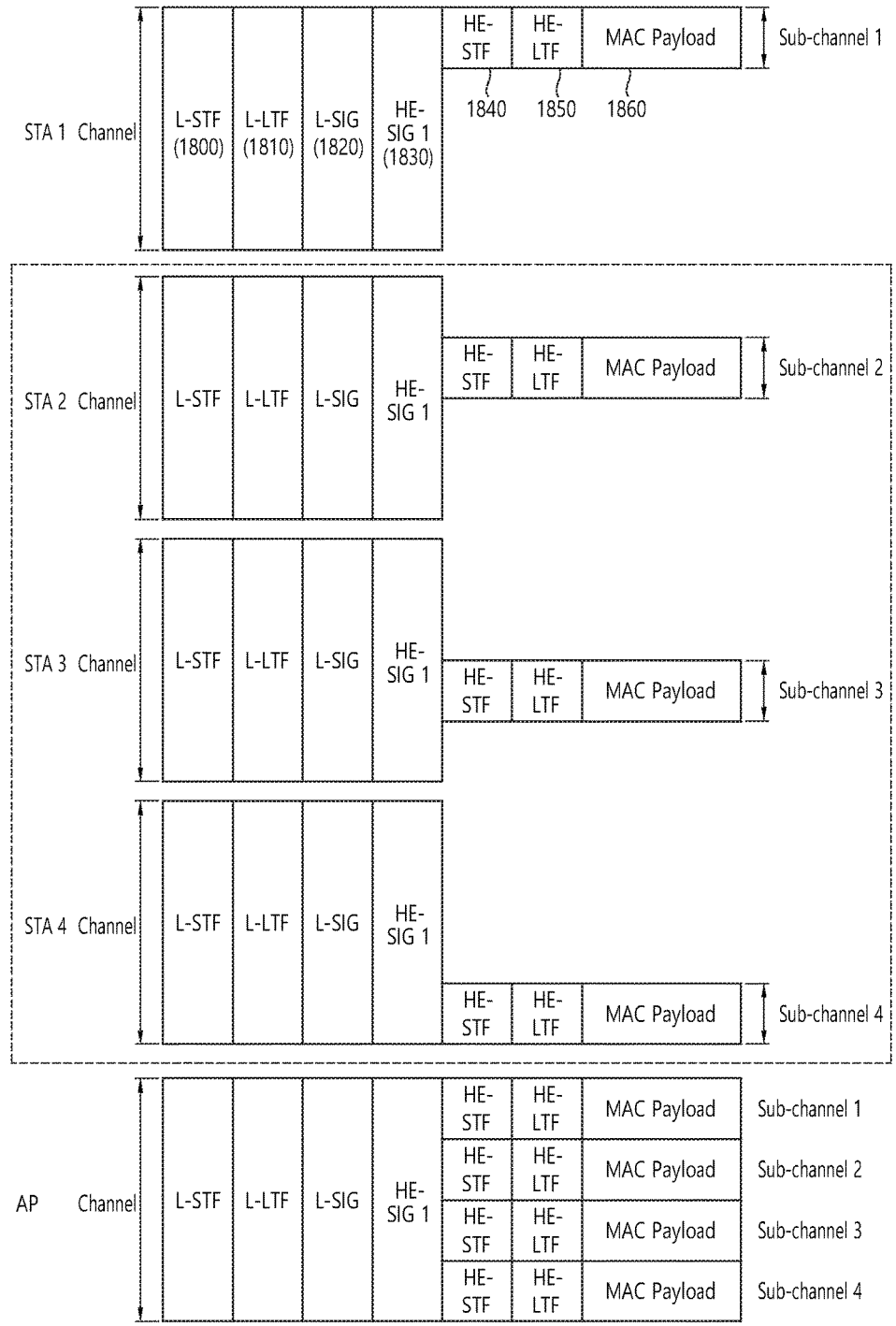
FIG. 18 illustrates a PPDU delivering an association request frame according to an embodiment of the present invention.

FIG. 18 illustrates a PPDU delivering an association request frame according to an embodiment of the present invention.

FIG. 18 discloses a PPDU delivering an association request frame triggered by the trigger frame disclosed in FIG. 16.

Referring to the upper part of FIG. 18, the association request frame may include the L-STF 1800, L-LTF 1810, L-SIG 1820, HE-SIG1 1830, and HE-STF 1840, HE-LTF 1850, and MAC payload 1860.

The L-STF 1800, L-LTF 1810, and L-SIG 1820 may perform the role as disclosed in FIG. 13. The STA located within the transmission coverage of the association request frame of the AP may be capable of decoding the L-STF 1800, L-LTF 1810, and L-SIG 1820 included in the probe response frame. The TXOP for the association request frame may be protected on the basis of decoding of the L-STF 1800, L-LTF 1810, and L-SIG 1820.

The HE-SIG1 1830 may include the information for decoding the HE-STF 1840, HE-LTF 1850, and MAC payload 1860. The HE-SIG1 1830 may also include the information obtained on the basis of the trigger frame, color bit information for BSS identification, or bandwidth information.

The HE-STF 1840 and the HE-LTF 1850 may be used for decoding of the MAC payload 1860. More specifically, the HE-STF 1840 may be used for improving automatic gain control estimation in the MIMO or OFDMA environment. The HE-LTF 1850 may be used for estimating a channel in the MIMO or OFDMA environment.

The MAC payload (or MPDU) 1860 may include the information element (or field) included in the MAC payload of an existing association request frame.

The upper part of FIG. 18 discloses an association request frame transmitted by one STA through the MU PPDU format on one sub-channel (for example, sub-channel 1). In the same way, the association request frame may be transmitted by a different STA through another sub-channel.

The middle part of FIG. 18 discloses an association request frame transmitted by other STAs through the MU PPDU on other sub-channels (for example, sub-channel2, sub-channel3, and sub-channel4). In the MU-PPDU transmitted by each of the other STAs, the L-STF to HE-SIG1 may include the same information. The HE-STF, HE-LTF, and MAC payload transmitted after the HE-SIG1 field may be different from each other, and each of a plurality of association request frames transmitted by the other STAs may be transmitted on the respective sub-channels.

The lower part of FIG. 18 discloses a plurality of probe request frames transmitted through each of a plurality of sub-channels by the respective STAs, as seen with respect to the AP.

The AP may receive each of a plurality of probe request frames through each of the sub-channel 1 to the sub-channel 4 on the basis of the MU PPDU disclosed in the upper and middle part of FIG. 18.

The STA may determine a sub-channel for transmitting the association request frame on the basis of the resource allocation information included in the trigger frame.

Figure 19:
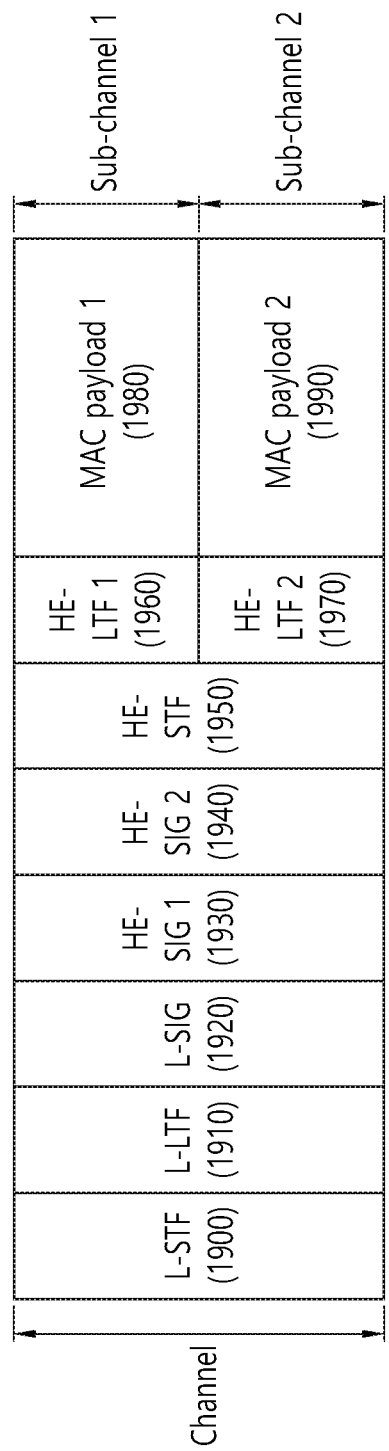
FIG. 19 illustrates a PPDU delivering an association response frame according to an embodiment of the present invention.

FIG. 19 illustrates a PPDU delivering an association response frame according to an embodiment of the present invention.

Referring to FIG. 19, the PPDU delivering an association response frame may include L-STF 1900, L-LTF 1910, L-SIG 1920, HE-SIG1 1930, HE-SIG2 1940, HE-STF 1950, HE-LTF1 1960/HE-LTF2 1970, and MAC payload1 1980/MAC payload2 1990.

The L-STF 1900, L-LTF 1910, and L-SIG 1920 may include the information as described in FIG. 13 and perform the role as described in FIG. 13. The STA located within the transmission coverage of the association response frame of the AP may be capable of decoding the L-STF 1900, L-LTF 1910, and L-SIG 1920 included in the probe response frame. The TXOP for the probe response frame may be protected on the basis of decoding of the L-STF 1900, L-LTF 1910, and L-SIG 1920.

The HE-SIG1 1930 and HE-SIG2 1940 may also include the information as described in FIG. 13 and perform the role as described in FIG. 13.

For example, the HE-SIG1 1930 may include the information for decoding of the HE-SIG2 1940, HE-STF 1950, HE-LTF1 1960/HE-LTF2 1970, and MAC payload1 1980/MAC payload2 1990; and the HE-SIG2 1940 may include the information about resource allocation of the current frame.

The HE-STF 1950 may be used for improving automatic gain control estimation in the MIMO or OFDMA environment.

The HE-LTF1 1960/HE-LTF2 1970 may be used for estimating a channel in the MIMO or OFDMA environment.

The HE-STF 1950 may be transmitted on a channel (for example, 20 MHz) including a plurality of sub-channels, and the HE-LTF1 1960/HE-LTF2 1970 may be transmitted on a sub-channel (for example, 10 MHz).

Each of a plurality of MAC payload (or MDPUs) may include the information element (or field) included in the MAC payload of an existing probe response frame.

The MAC payload 1 1980 may be transmitted to STA1 through the sub-channel 1, and the MAC payload 2 1990 may be transmitted to STA2 through the sub-channel 2.

Figure 20:
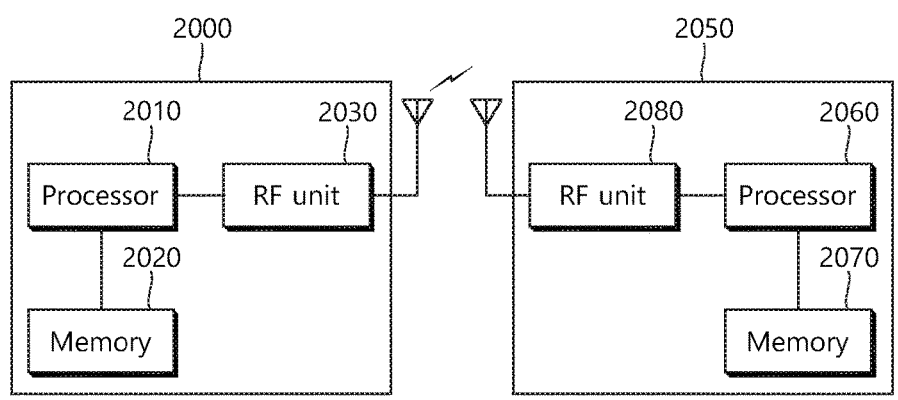
FIG. 20 illustrates a wireless device to which an embodiment of the present invention may be applied.

FIG. 20 illustrates a wireless device to which an embodiment of the present invention may be applied.

Referring to FIG. 20, the AP 2000 comprises a processor 2010, memory 2020, and RF (Radio Frequency) unit 2030.

The RF unit 2030, being connected to the processor 2010, may transmit/receive a radio signal.

The processor 2010 may implement the function, process and/or method proposed by the present invention. For example, the processor 2010 may be configured to perform the operation of the AP according to the embodiments of the present invention described above. The processor may perform the operation of the AP disclosed in the embodiments of FIGS. 1 to 19.

For example, the processor 2010 may be configured to transmit a trigger frame on a channel, receive a first probe request frame transmitted on a first sub-channel by a first STA in response to the trigger frame, receive a second probe request frame transmitted on a second sub-channel by a second STA in response to the trigger frame, and transmit on the channel the MU (Multi-User) PPDU (Physical Layer Protocol Unit) including a first probe response frame which is a response to the first probe request frame and a second probe response frame which is a response to the first probe request frame.

At this time, the channel may include the first and the second sub-channel.

At this time, the trigger frame may include the information about probing duration, where the probing duration is the transmission duration of the probe request frame, and the first probe request frame and the second probe request frame may be transmitted within the probing duration.

At this time, the trigger frame may further include trigger period information and trigger frame type information, the trigger period information may include information about the transmission period of the trigger frame; and the trigger frame type information may include the information about the type of the frame triggered by the trigger frame.

At this time, the first probe request frame and the second probe request frame may be delivered on an overlapping time resource through the MU PPDU.

At this time, each of the first and the second probe request frames may be transmitted sequentially on a non-overlapping time resource through the SU (Single User) PPDU within the probing duration, where the probing duration may be the transmission duration of the probe request frame configured by the trigger frame.

The STA 2050 comprises a processor 2060, memory 2070, and RF (Radio Frequency) unit 2080.

The RF unit 2080, being connected to the processor 2060, may transmit/receive a radio signal.

The processor 2060 may implement the function, process and/or method proposed by the present invention. For example, the processor 2020 may be configured to perform the operation of the STA according to the embodiments of the present invention described above. The processor 2060 may perform the operation of the STA disclosed in the embodiments of FIGS. 1 to 19.

For example, the processor 2060 may transmit each of the first and the second probe request frames sequentially on a non-overlapping time resource through the SU (Single User) PPDU within the probing duration in response to the trigger frame transmitted by the AP.

The processor 2010, 2060 may include ASIC (Application-Specific Integrated Circuit), other chipsets, logical circuits, data processing devices and/or converters converting a baseband signal and radio signal. The memory 2020, 2070 may include ROM (Read-Only Memory), RAM (Random Access Memory), flash memory, memory cards, storage media and/or other storage devices. The RF unit 2030, 2080 may include one or more antennas transmitting and/or receiving a radio signal.

When the embodiments are implemented by software, the methods described above may be implemented by modules (processes or functions) performing the functions described above. A module may be stored in the memory 2020, 2070 and executed by the processor 2010, 2060. The memory 2020, 2070 may be installed inside or outside the processor 2010, 2060 and connected to the processor 2010, 2060 using a variety of well-known means.

What is claimed is:

1. A method for performing an initial access in a wireless local area network (WLAN), the method comprising:
    transmitting, by an access point (AP), a trigger frame for triggering multiple active scanning procedures from multiple stations (STAs) via a basic channel,
    wherein the trigger frame includes first information related to a contending duration allocated for the multiple active scanning procedures to be performed by the multiple STAs, and
    wherein the trigger frame further includes second information related to a transmission period of the trigger frame and third information related to a frame type of a frame triggered by the trigger frame;
    in response to the trigger frame:
        receiving, by the AP via a first subchannel included in the basic channel, a first probe request frame; and
        receiving, by the AP via a second subchannel included in the basic channel, a second probe request frame from a second STA attempting to associate with the AP within the contending duration; and
    transmitting, by the AP, a Multi-User Physical Layer Protocol Unit (MU-PPDU) including a first probe response frame and a second probe response frame via the basic channel when the contending duration has elapsed,
    wherein the first probe response frame is transmitted to the first STA in response to the first probe request frame, and
    wherein the second probe response frame is transmitted to the second STA in response to the second probe request frame.

2. The method of claim 1, wherein the first probe request frame and the second probe request frame are transmitted on an overlapping time resource.

3. The method of claim 1,
    wherein each of the first probe request frame and the second probe request frame is transmitted sequentially within the contending duration, and
    wherein the contending duration is signaled to the multiple STAs based on the trigger frame.

4. An Access Point (AP) for performing an initial access in a wireless local area network (WLAN), the AP comprising:
    a Radio Frequency (RF) unit including a transceiver implemented to transmit or receive a radio signal; and
    a processor connected to the RF unit operatively, wherein the processor is configured to:
        transmit a trigger frame for triggering multiple active scanning procedures from multiple stations (STAs) via a basic channel,
        wherein the trigger frame includes first information related to a contending duration allocated for the multiple active scanning procedures to be performed by the multiple STAs, and
        wherein the trigger frame further includes second information related to a transmission period of the trigger frame and third information related to a frame type of a frame triggered by the trigger frame;
        in response to the trigger frame:
            receive, via a first subchannel included in the basic channel, a first probe request frame from a first STA attempting to associate with the AP within the contending duration,
            receive, via a second subchannel included in the basic channel, a second probe request frame from a second STA attempting to associate with the AP within the contending duration; and
        transmit an Multi-User Physical Layer Protocol Unit (MU PPDU) including a first probe response frame and a second probe response frame via the basic channel when the contending duration has elapsed,
        wherein the first probe response frame is transmitted to the first STA in response to the first probe request frame, and
        wherein the second probe response frame is transmitted to the second STA in response to the second probe request frame.

5. The AP of claim 4, wherein the first probe request frame and the second probe request frame are transmitted on an overlapping time resource.

6. The AP of claim 4,
wherein each of the first probe request frame and the second probe request frame is transmitted sequentially within the contending duration, and
wherein the contending duration is signaled to the multiple STAs based on the trigger frame.

7. The method of claim 1, wherein the first subchannel and the second subchannel are different subchannels of the basic channel.

8. The AP of claim 4, wherein the first subchannel and the second subchannel are different subchannels of the basic channel.

* * * * *